United States Patent
Hirota et al.

(10) Patent No.: US 10,184,072 B2
(45) Date of Patent: Jan. 22, 2019

(54) COATING AGENT, DECORATIVE FILM, AND ARTICLE

(71) Applicant: MITSUI CHEMICALS, INC., Tokyo (JP)

(72) Inventors: Yoshihito Hirota, Chiba (JP); Yuichi Itou, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/527,315

(22) PCT Filed: Nov. 13, 2015

(86) PCT No.: PCT/JP2015/081936
§ 371 (c)(1),
(2) Date: May 16, 2017

(87) PCT Pub. No.: WO2016/080297
PCT Pub. Date: May 26, 2016

(65) Prior Publication Data
US 2017/0321093 A1 Nov. 9, 2017

(30) Foreign Application Priority Data

Nov. 17, 2014 (JP) .................................. 2014-232669

(51) Int. Cl.
| | | |
|---|---|---|
| *C09J 123/28* | (2006.01) | |
| *C09D 7/40* | (2018.01) | |
| *B32B 27/00* | (2006.01) | |
| *C08F 8/46* | (2006.01) | |
| *C09D 123/00* | (2006.01) | |
| *C09D 123/28* | (2006.01) | |
| *C09D 175/04* | (2006.01) | |
| *C09J 123/10* | (2006.01) | |
| *C09J 175/04* | (2006.01) | |
| *C08F 255/10* | (2006.01) | |
| *C09J 151/06* | (2006.01) | |
| *C09J 7/35* | (2018.01) | |
| *C09D 5/00* | (2006.01) | |
| *C09D 7/63* | (2018.01) | |
| *C08F 210/06* | (2006.01) | |
| *C08K 5/101* | (2006.01) | |
| *C08F 4/659* | (2006.01) | |
| *C08F 4/6592* | (2006.01) | |

(52) U.S. Cl.
CPC ............ *C09J 123/28* (2013.01); *B32B 27/00* (2013.01); *C08F 8/46* (2013.01); *C08F 210/06* (2013.01); *C08F 255/10* (2013.01); *C09D 5/002* (2013.01); *C09D 7/40* (2018.01); *C09D 7/63* (2018.01); *C09D 123/00* (2013.01); *C09D 123/28* (2013.01); *C09D 175/04* (2013.01); *C09J 7/35* (2018.01); *C09J 123/10* (2013.01); *C09J 151/06* (2013.01); *C09J 175/04* (2013.01); *C08F 4/65912* (2013.01); *C08F 4/65927* (2013.01); *C08K 5/101* (2013.01); *C09J 2201/622* (2013.01); *C09J 2423/00* (2013.01); *C09J 2451/00* (2013.01)

(58) Field of Classification Search
CPC ...... C09J 123/28; C09J 175/04; C09J 123/10; C08F 8/46; C09D 123/00
USPC .......................................................... 524/527
See application file for complete search history.

(56) References Cited

U.S. PATENT DOCUMENTS

| | | | |
|---|---|---|---|
| 5,095,059 A * | 3/1992 | Kitamura ............. | C09J 151/003 524/272 |
| 5,994,437 A | 11/1999 | Lebez et al. | |
| 6,486,246 B1 | 11/2002 | Vion | |
| 7,645,829 B2 * | 1/2010 | Tse ........................ | C09D 123/10 524/515 |
| 7,795,366 B2 * | 9/2010 | Yang ....................... | C08K 5/01 526/348 |
| 2003/0212202 A1 | 11/2003 | Haner et al. | |
| 2006/0276607 A1 | 12/2006 | Ikenaga et al. | |
| 2008/0292896 A1 | 11/2008 | Ikenaga et al. | |
| 2008/0306219 A1 | 12/2008 | Ikenaga et al. | |
| 2008/0306234 A1 | 12/2008 | Ikenaga et al. | |
| 2008/0312461 A1 | 12/2008 | Ikenaga et al. | |
| 2009/0043050 A1 | 2/2009 | Ikenaga et al. | |
| 2011/0196103 A1 | 8/2011 | Kawahara et al. | |
| 2015/0087769 A1 * | 3/2015 | Hirota ................... | C08F 255/10 524/576 |

FOREIGN PATENT DOCUMENTS

| | | | |
|---|---|---|---|
| JP | S58-067772 A | | 4/1983 |
| JP | H02-000684 A | | 1/1990 |
| JP | 02272013 | * | 11/1990 |
| JP | H02-272013 A | | 11/1990 |
| JP | H04-218581 A | | 8/1992 |
| JP | H04-256468 A | | 9/1992 |
| JP | H08-003525 A | | 1/1996 |
| JP | H11-199833 A | | 7/1999 |

(Continued)

OTHER PUBLICATIONS

Arakawa Chemical, product sheet of Super Ester A-115, 2018.*

(Continued)

*Primary Examiner* — Hui H Chin
(74) *Attorney, Agent, or Firm* — Foley & Lardner LLP

(57) ABSTRACT

An object of the present invention is to provide a coating agent giving a coating film that has good adhesion and stability over time, a decorative film having at least one layer formed from the coating agent; and an article decorated with the decorative film. The coating agent of the present invention contains, in a specific ratio, an olefin polymer (A) having a heat of fusion of in the range of 0 to 50 J/g and having a weight average molecular weight (Mw) as measured by GPC of $1 \times 10^4$ to $1000 \times 10^4$, a hydrocarbon-based synthetic oil (B) having a 40° C. kinematic viscosity of 30 to 500,000 cSt, and a tackifier (C) having an acid value of 10 or more and having a weight average molecular weight (Mw) of $0.9 \times 10^3$ to $3 \times 10^3$.

12 Claims, No Drawings

(56) References Cited

FOREIGN PATENT DOCUMENTS

| JP | 2001-523301 A | 11/2001 |
|----|----|----|
| JP | 2002-080783 A | 3/2002 |
| JP | 2005-530913 A | 10/2005 |
| JP | 3733564 B2 | 1/2006 |
| JP | 3939464 B2 | 4/2007 |
| JP | 2012-246375 A | 12/2012 |
| WO | WO-2004/087775 A1 | 10/2004 |
| WO | WO-2007/002177 A1 | 1/2007 |
| WO | WO-2013/164976 A1 | 11/2013 |

OTHER PUBLICATIONS

Encyclopedia of Polymer of Science and Engineering, 2nd Edition, Isobutylene Polymers, vol. 8, pp. 432-433.

International Search Report issued in International Patent Application No. PCT/JP2015/081936 dated Feb. 4, 2016.

Extended European Search Report dated Aug. 30, 2018 in corresponding application No. 15860756.4.

\* cited by examiner

COATING AGENT, DECORATIVE FILM, AND ARTICLE

CROSS-REFERENCE TO RELATED APPLICATIONS

The present application is a U.S. national stage application of International Patent Application No. PCT/JP2015/081936, filed Nov. 13, 2015, which claims the benefit of priority to Japanese Patent Application No. 2014-232669, filed Nov. 17, 2014, the entireties of which are hereby incorporated by reference.

TECHNICAL FIELD

The present invention relates to a coating agent, a decorative film and an article, and in more detail, relates to a coating agent useful as a coating material, a primer and an adhesive, a decorative film and an article.

BACKGROUND ART

As a coating agent for imparting a coating film that has superior adhesion to a polyolefin resin, a coating agent comprising a specific olefin polymer and a specific hydrocarbon-based synthetic oil has been known (Patent Document 1). Here, Patent Document 1 shows that this coating agent has good adhesion to several kinds of adherends.

RELATED ART DOCUMENT

Patent Document

Patent Document 1: WO2013/164976

SUMMARY OF THE INVENTION

Technical Problem

Although the coating agent described in Patent Document 1 has good adhesion to a certain kind of adherend, it has been found that there still remain some problems to be solved in this coating agent. Specifically, it has been found that some adherends may not necessarily exhibit sufficient adhesion and thus more extensive types of adherends to be coated are required. It is also found that, when combined with some adherends, the coating agent may not necessarily exhibit sufficient stability over time and thus the stability over time needs to be improved.

An object of the present invention is to provide a coating agent giving a coating film that has good adhesion and stability over time, a decorative film having at least one layer formed from the coating agent; and an article decorated with the decorative film.

Technical Solution

The present inventors made their earnest studies in view of the above situation, and have found that by using a coating agent that is given by incorporating a hydrocarbon-based synthetic oil having a specific kinematic viscosity and a specific tackifier to a specific low-crystalline olefin polymer, improved adhesion to a base material to be decorated is attained, and improved stability over time can be concurrently attained, thereby perfecting the present invention.

That is, the present invention relates to the following [1] to [15].

[1] A coating agent comprising
an olefin polymer (A) having a heat of fusion as measured in accordance with JIS K 7122 of in the range of 0 to 50 J/g and having a weight average molecular weight (Mw) as measured by GPC of $1\times10^4$ to $1000\times10^4$,
a hydrocarbon-based synthetic oil (B) having a 40° C. kinematic viscosity of 30 to 500,000 cSt, and
a tackifier (C) having an acid value as determined according to JIS K 0070 of 10 or more and having a weight average molecular weight (Mw) as measured by GPC of $0.9\times10^3$ to $3\times10^3$;
wherein the olefin polymer (A) accounts for 30 to 88% by weight, the hydrocarbon-based synthetic oil (B) accounts for 30 to 6% by weight, and the tackifier (C) accounts for 40 to 6% by weight (provided that the total of (A), (B), and (C) is 100% by weight).

[2] The coating agent described in [1], wherein the olefin polymer (A) is at least one selected from the group consisting of (A1) to (A3):
(A1) a polymer containing structural units derived from α-olefins having 2 to 20 carbon atoms;
(A2) a modified olefin polymer obtained from a polymer which contains structural units derived from α-olefins having 2 to 20 carbon atoms and part or whole of which is graft-modified with a polar group-containing monomer; and
(A3) a halogenated olefin polymer obtained from a polymer which contains structural units derived from α-olefins having 2 to 20 carbon atoms and part or whole of which is halogen-modified.

[3] The coating agent described in [2], wherein the (A2) described above is (A2') described below and the (A3) described above is (A3') described below:
(A2') a modified olefin polymer obtained from a polymer which contains structural units derived from α-olefins having 2 to 20 carbon atoms and part or whole of which is graft-modified with a polar group-containing monomer, wherein based on 100 parts by weight of the modified olefin polymer, 0.1 to 15 parts by weight of structural units derived from the polar group-containing monomer is contained; and
(A3') a halogen-modified olefin polymer obtained from a polymer which contains structural units derived from α-olefins having 2 to 20 carbon atoms and part or whole of which is halogen-modified, wherein based on 100 parts by weight of the halogen-modified olefin polymer, the halogen content is 2 to 40 parts by weight.

[4] The coating agent described in [3], wherein the (A1) described above is (A1") described below, the (A2') described above is (A2") described below, and the (A3') described above is (A3") described below:
(A1") a propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %);
(A2") a modified olefin polymer obtained from a propylene-based polymer part or whole of which is graft-modified with a polar group-containing monomer, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the modified olefin polymer, 0.1 to 15 parts by weight of structural units derived from the polar group-containing monomer is contained; and (A3″) a halogen-modified olefin polymer obtained from a propylene-based polymer part or whole of which is halogen-modified, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the halogen-modified olefin polymer, the halogen content is 2 to 40 parts by weight.

[5] The coating agent described in any one of [2] to [4], wherein the polar group-containing monomer is at least one selected from unsaturated carboxylic acids and unsaturated carboxylic acid anhydrides.

[6] The coating agent described in any one of [1] to [5], wherein the hydrocarbon-based synthetic oil (B) is a polymer of an olefin having 2 to 20 carbon atoms.

[7] The coating agent described in any one of [1] to [6], wherein the tackifier (C) is a rosin ester and a derivative thereof.

[8] The coating agent described in any one of [1] to [7], further comprising a curing agent (D).

[9] The coating agent described in [8], wherein the curing agent (D) is at least one selected from an aliphatic polyisocyanate and a multimer of aliphatic polyisocyanate.

[10] The coating agent described in any one of [1] to [9], which is a primer.

[11] The coating agent described in any one of [1] to [9], which is a coating material.

[12] The coating agent described in any one of [1] to [9], which is a hot melt adhesive.

[13] A decorative film having at least one layer formed from the coating agent described in any one of [1] to [9].

[14] An article decorated with the decorative film described in [13].

[15] The article described in [14], wherein the decoration is performed using a vacuum pressure forming machine.

Effects of the Invention

The coating agent of the present invention provides a coating film that has excellent adhesion to polyolefin resin base materials and that has satisfactory adhesion also to high-polarity base materials including acrylic resins, polyester-based resins, polycarbonate-based resins, ABS resins, and polystyrene-based resins.

The decorative film of the present invention has excellent adhesion to polyolefin resin base materials and has satisfactory adhesion also to high-polarity base materials including acrylic resins, polyester-based resins, polycarbonate-based resins, ABS resins, and polystyrene-based resins.

The article of the present invention is decorated with the decorative film, and therefore the adhesion is high between the decorative film and a base material.

DESCRIPTION OF EMBODIMENTS

[Coating Agent]

The coating agent of the present invention includes an olefin polymer (A) having a heat of fusion as measured in accordance with JIS K 7122 in the range of 0 to 50 J/g and having a weight average molecular weight (Mw) as measured by GPC of $1 \times 10^4$ to $1000 \times 10^4$, a hydrocarbon-based synthetic oil (B) having a 40° C. kinematic viscosity of 30 to 500,000 cSt, and a tackifier (C) having an acid value as determined according to JIS K 0070 of 10 or more and having a weight average molecular weight (Mw) as measured by GPC of $1 \times 10^3$ to $3 \times 10^3$.

Here, in the coating agent of the present invention, provided that the total of the olefin polymer (A), the hydrocarbon-based synthetic oil (B), and the tackifier (C) is 100% by weight, the olefin polymer (A) accounts for 30 to 88% by weight; the above-mentioned hydrocarbon-based synthetic oil (B) accounts for 30 to 6% by weight; and the above-mentioned tackifier (C) accounts for 40 to 6% by weight.

Olefin Polymer (A)

The olefin polymer (A) used in the present invention has a heat of fusion as measured in accordance with JIS K 7122 in the range of 0 to 50 J/g and having a weight average molecular weight (Mw) as measured by GPC of $1 \times 10^4$ to $1000 \times 10^4$. That is, the coating agent of the present invention uses, as the olefin polymer (A), a substance with crystallinity that is low to some degree. In the present specification, for the distinction from the "hydrocarbon-based synthetic oil (B)" described later, the olefin polymer (A) is sometimes called a "low-crystalline olefin resin (A)" or a "low-crystalline olefin resin".

Here, the amount of heat of fusion can be determined in accordance with JIS K 7122 by differential scanning calorimetry (DSC measurement) and, to be specific, is calculated from a peak area of thermogram obtained in temperature-increase process conducted at 10° C./min. On the occasion of the measurement, in the present invention, for the purpose of cancelling heat history before the measurement, prior to the measurement, temperature is increased at 10° C./min to a melting point+20° C. or more, and this temperature is maintained for three minutes, and thereafter the temperature is decreased at 10° C./min to room temperature or less. After this procedure, the amount of heat of fusion is measured.

The amount of heat of fusion is 0 J/g or more and 50 J/g or less, the lower limit being preferably 3 J/g, more preferably 5 J/g, the upper limit being preferably 40 J/g or less, more preferably 30 J/g or less. The amount of heat of fusion being 50 J/g or less is preferred, since the state where the coating agent of the present invention is dissolved in a solvent, namely the state of a varnish, is so stable that solidification and precipitation hardly occur.

Meanwhile, in terms of strength and anti-tackiness of the coating film, it is preferred for the lower limit of the amount of heat of fusion to be higher.

The olefin polymer (A) used in the present invention has a weight average molecular weight as measured by GPC in terms of polystyrene of $1 \times 10^4$ or more and $1000 \times 10^4$ or less, more preferably $2 \times 10^4$ or more and $100 \times 10^4$ or less, still more preferably $3 \times 10^4$ or more and $50 \times 10^4$ or less. The weight average molecular weight of $1 \times 10^4$ or more is preferable in that a coating film can have sufficiently high strength as well as good adhesion strength. Meanwhile, the weight average molecular weight of $1000 \times 10^4$ or less is preferable, since the state of a varnish is so stable that solidification and precipitation hardly occur. In particular, the olefin polymer (A) when having a small weight average molecular weight (for example, not more than $50 \times 10^4$) tends to give excellent adhesion performance, in particular.

The olefin polymer (A) used in the present invention is not particularly limited as long as fulfilling the requirements in terms of the amount of heat of fusion and the weight average molecular weight; and examples thereof include a homopolymer of α-olefin or a copolymer of two or more α-olefins.

Examples of the α-olefin include α-olefins having 2 to 20 carbon atoms, which include, for example, ethylene, propylene, 1-butene, octene, and 4-methyl-1-pentene. That is, examples of the olefin polymer (A) include polymers containing structural units derived from α-olefins having 2 to 20 carbon atoms.

The olefin polymer (A) may further contain structural units derived from unsaturated monomers other than the α-olefins (hereinafter referred to as the "other unsaturated monomers") in a range that is not more than 10 mol % based on 100 mol % of structural units derived from the α-olefins. Here, examples of said other unsaturated monomers include conjugated polyenes such as butadiene and isoprene and nonconjugated polyenes such as 1,4-hexadiene, 1,7-octadiene, dicyclopentadiene, 5-ethylidene-2-norbornene, 5-vinyl-2-norbornene, 5-methylene-2-norbornene and 2,5-norbornadiene. When the olefin polymer (A) is a copolymer containing structural units derived from two or more kinds of α-olefins, the polymer (A) may be a random copolymer or a block copolymer.

Further, the olefin polymer (A) may be a modified olefin polymer which is obtained, for example, by allowing a polymer or a copolymer containing structural units derived from the α-olefins to be graft-reacted with an unsaturated monomer containing e.g., a hydroxyl group, a carboxylic acid anhydride or —COOX (X: H, M) (wherein H is hydrogen; and M is an alkali metal, an alkali earth metal or a cation derived from an amine). Further, the olefin polymer (A) may be a halogenated olefin polymer obtained by further halogenating a polymer or a copolymer containing structural units derived from the α-olefins.

The olefin polymer (A) preferably used in the present invention is, for example, at least one polymer selected from the following (A1) to (A3):

(A1) a polymer containing structural units derived from α-olefins having 2 to 20 carbon atoms (hereinafter referred to as "polymer (A1)");

(A2) a modified olefin polymer obtained from a polymer which contains structural units derived from α-olefins having 2 to 20 carbon atoms and part or whole of which is graft-modified with a polar group-containing monomer (hereinafter referred to as "modified olefin polymer (A2)"); and (A3) a halogen-modified olefin polymer obtained from a polymer which contains structural units derived from α-olefins having 2 to 20 carbon atoms and part or whole of which is halogen-modified (hereinafter referred to as "halogenated olefin polymer (A3)").

Polymer (A1)

Examples of the polymer (A1) are polymers containing structural units derived from α-olefins having 2 to 20 carbon atoms described above. That is, in the present invention, polymers containing structural units derived from α-olefins having 2 to 20 carbon atoms per se, without being subjected to modification treatment such as graft modification and halogen modification, may be used as the polymer (A1) for the olefin polymer (A). In this sense, the polymer (A1) can be referred to as an unmodified polymer (A1), which is distinguished from a "modified olefin polymer (A2)" and a "halogenated olefin polymer (A3)" which are described later.

Here, the polymer (A1) according to a preferred embodiment of the present invention is a propylene-based polymer containing 50 to 100 mol % of structural units derived from propylene and 50 to 0 mol % of structural units derived from α-olefins having 2 to 20 carbon atoms excluding propylene, provided that the total of the structural units derived from α-olefins having 2 to 20 carbon atoms is 100 mol %. Here, preferred examples of the "α-olefins having 2 to 20 carbon atoms excluding propylene" include 1-butene and octene. Here, provided that the total of the structural units derived from α-olefins having 2 to 20 carbon atoms is 100 mol %, more preferred is a propylene-based polymer containing structural units derived from propylene accounting for 55 to 90 mol %, still more preferably 60 to 85 mol %, further preferably 60 to 80 mol %, and structural units derived from α-olefins having 2 to 20 carbon atoms excluding propylene accounting for 45 to 10 mol %, still more preferably 40 to 15 mol %, further preferably 40 to 20 mol %.

In the present invention, the polymer (A1) may be used singly or in combination of two or more kinds thereof.

Further, the polymer (A1) used in the present invention can be produced by a conventionally known process which is not particularly limited as long as the olefin polymer (A) as a whole fulfills the above-mentioned amount of heat of fusion and the above-mentioned weight average molecular weight (Mw). For example, the polymer (A1) can be produced in accordance with methods described in JP-B-3939464 and WO 2004/87775. Here, taking, as an example, a propylene.1-butene copolymer that is preferably used as the polymer (A1) in the present invention, the propylene.1-butene copolymer can be produced by copolymerizing propylene and 1-butene, for example, in the presence of a metallocene catalyst composed of an appropriate metallocene compound such as rac-dimethylsilylene-bis{1-(2-methyl-4-phenylindenyl)}zirconium dichloride, an organic aluminum oxy compound such as aluminoxane, and an optionally used organoaluminum compound such as tributylaluminum.

Modified Olefin Polymer (A2)

Examples of the modified olefin polymer (A2) are modified olefin polymers obtained from polymers which contain structural units derived from the α-olefins having 2 to 20 carbon atoms and part or whole of which is graft-modified with a polar group-containing monomer. Preferably, based on 100 parts by weight of the modified olefin polymer, structural units derived from the polar group-containing monomer are contained in an amount of 0.1 to 15 parts by weight, more preferably 0.5 to 10 parts by weight. For example, in the present invention, a polymer containing structural units derived from α-olefins having 2 to 20 carbon atoms, (A1a), may be graft-modified with a polar group-containing monomer, and a graft-modified olefin polymer (A2m) thus obtained per se can be defined as the modified olefin polymer (A2), and this can be used for the olefin polymer (A). Here, examples of the polymer (A1a) may be those given as the polymer (A1).

Further, the modified olefin polymer (A2) may be a mixture of a graft-modified product of the polymer (A1a) described above, namely the graft-modified olefin polymer (A2m) and the unmodified polymer (A1a) that is used in the form of modified olefin polymer composition. In this case, the polymer (A1a) used for graft modification for obtaining the graft-modified olefin polymer (A2m) and the polymer (A1a) used without being modified may be the same or different. This embodiment is an example where part of the polymer containing structural units derived from α-olefins having 2 to 20 carbon atoms is graft-modified with a polar group-containing monomer.

The weight average molecular weight of the polymer (A1a) employable above is not particularly limited as long as the corresponding modified olefin polymer (A2) as a whole fulfills the above-mentioned weight average molecular weight, and is usually in the range of $1 \times 10^4$ to $1000 \times 10^4$, preferably 2×10⁴ or more and 100×10⁴ or less, and more preferably 3×10⁴ or more and 50×10⁴ or less. Further, the amount of heat of fusion as measured in accordance with JIS K 7122 is not particularly limited as long as the modified olefin polymer (A2) fulfills the above-mentioned weight average molecular weight; and the amount of heat of fusion is 0 J/g or more and 50 J/g or less, the lower limit being preferably 3 J/g and more preferably 5 J/g and the upper limit being preferably 40 J/g or less and more preferably 30 J/g or less. Further, the modified olefin polymer (A2) used in the present invention preferably contains 0.1 to 15 parts by weight of structural units derived from the polar group-containing monomer based on 100 parts by weight of the total of the graft-modified olefin polymer (A2m) and the optionally used unmodified polymer (A1a).

In the present invention, to obtain the graft-modified olefin polymer (A2m) constituting the modified olefin polymer (A2), the polymer (A1a) is graft copolymerized with a polar group-containing monomer. Examples of the polar group-containing monomer are hydroxyl group-containing ethylenically unsaturated compounds, amino group-containing ethylenically unsaturated compounds, epoxy group-containing ethylenically unsaturated compounds, unsaturated carboxylic acids and their anhydrides and their derivatives, vinyl ester compounds, and vinyl chloride. Preferred are unsaturated carboxylic acids and their anhydrides.

Examples of the hydroxyl group-containing ethylenically unsaturated compound include hydroxyl group-containing (meth)acrylic acid esters such as hydroxyethyl (meth)acrylate, 2-hydroxy propyl (meth)acrylate, 3-hydroxypropyl (meth)acrylate, 2-hydroxy-3-phenoxy-propyl (meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol mono(meth)acrylate, polyethylene glycolmono(meth)acrylate, and 2-(6-hydrohexanoyloxy)ethyl acrylate and 10-undecene-1-ol, 1-octene-3-ol, 2-methanolnorbornene, hydroxystyrene, N-methylolacrylamide, 2-(meth)acryloyloxy ethyl acid phosphate, glycerin monoallyl ether, allyl alcohol, allyloxy ethanol, 2-butene-1,4-diol, and glycerin monoalcohol.

Examples of the amino group-containing ethylenically unsaturated compounds include vinyl-based monomers having at least one kind of amino group or substituted amino group that is represented by the following formula.

—NR₁R₂

(wherein $R_1$ is a hydrogen atom, a methyl group or an ethyl group; $R_2$ is a hydrogen atom, an alkyl group having 1 to 12 carbon atoms, preferably 1 to 8 carbon atoms, or a cycloalkyl group having 8 to 12 carbon atoms, preferably 6 to 9 carbon atoms; and the alkyl group and the cycloalkyl group may further have a substituent).

Examples of such an amino group-containing ethylenically unsaturated compound include alkyl ester-based derivatives of acrylic acid or methacrylic acid such as aminomethyl (meth)acrylate, propylaminoethyl (meth)acrylate, dimethylaminoethyl methacrylate, aminopropyl (meth)acrylate, phenylaminomethyl methacrylate, and cyclohexylaminoethyl methacrylate; vinylamine-based derivatives such as N-vinyldiethylamine and N-acetylvinylamine; amides such as acrylamide-based derivatives such as acrylamide, methacrylamide, N-methylacrylamide, N,N-dimethylacrylamide, and N,N-dimethylaminopropylacrylamide.

Examples of the epoxy group-containing ethylenically unsaturated compounds include monomers having at least one polymerizable unsaturated bonding group and epoxy group in one molecule.

Examples of the epoxy group-containing ethylenically unsaturated compounds include glycidyl esters of unsaturated carboxylic acids, such as glycidyl acrylate and glycidyl methacrylate; monoglycidyl esters of unsaturated dicarboxylic acids such as maleic acid, fumaric acid, crotonic acid, tetrahydrophthalic acid, itaconic acid, citraconic acid, endo-cis-bicyclo[2,2,1]hepto-5-en-2,3-dicarboxylic acid (nadic Acid™) endo-cis-bicyclo[2,2,1]hepto-5-en-2-methyl-2,3-dicarboxylic acid (methylnadic Acid™) (number of carbons of an alkyl group forming the monoglycidyl ester: 1 to 12); alkyl glycidyl ester of p-styrenecarboxylic acid, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

Examples of the unsaturated carboxylic acids include unsaturated carboxylic acids such as acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2,2,1]hepto-2-en-5,6-dicarboxylic acid; and their derivatives (for example, acid anhydrides, acid halides, amides, imides, esters).

Examples of the derivatives of the unsaturated carboxylic acid include malenyl chloride, malenyl imide, maleic anhydride, itaconic anhydride, citraconic anhydride, tetrahydrophthalic anhydride, bicyclo[2,2,1]hepto-2-en-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hepto-2-en-5,6-dicarboxylate, hydroxyethyl (meth)acrylate, hydroxypropyl (meth)acrylate, glycidyl (meth)acrylate, aminoethyl methacrylate and aminopropyl methacrylate.

Examples of the vinyl ester compounds include vinyl acetate, vinyl propionate, vinyl n-lactate, vinyl isolactate, vinyl pivalate, vinyl caproate, vinyl versatate, vinyl laurate, vinyl stearate, vinyl benzoate, vinyl salicylate and vinyl cyclohexanecarboxylate.

A single kind or multiple kinds of these polar group-containing monomers may be used.

When the graft-modified olefin polymer (A2m) per se is used as the modified olefin polymer (A2), it is preferable that the polar group-containing monomer is used for graft copolymerization in an amount of 0.1 to 15 parts by weight, preferably 0.5 to 10 parts by weight based on 100 parts by weight of the graft-modified olefin polymer (A2m).

The content proportion of the polar group-containing monomer can be measured by using a feeding ratio at the time of reacting an olefin polymer with a polar group-containing monomer in the presence of e.g., a radical initiator, or by known means such as ¹H NMR measurement. Specific examples of NMR measurement conditions are as follows.

In ¹H NMR measurement, ECX400, a nuclear magnetic resonance apparatus manufactured by JEOL, Ltd. is used. The conditions are as follows. The solvent is deuterated orthodichlorobenzene; the sample concentration is 20 mg/0.6 mL; the measurement temperature is 120° C.: the observation nucleus is ¹H (400 MHz); the sequence is a single pulse; the pulse width is 5.12 μsec (45° pulse); the repetition time is 7.0 seconds; the number of scans is 500 or more; and a standard chemical shift is set at 0 ppm for hydrogen of tetramethylsilane, and the same result can be obtained also when a standard chemical shift is set at 7.10 ppm for a peak derived from remaining hydrogen of deuterated orthodichlorobenzene. Peaks of e.g., $^1$H derived from functional group-containing compounds can be assigned by ordinary method.

When the polar group-containing monomer used is a monomer having an acid functional group such as the unsaturated carboxylic acid and its anhydride, an amount that can be used as a guide for the amount of the functional group introduced to the modified olefin polymer (A2) is, for example, an acid value. Here, how to measure the acid value is, for example, as follows.

<Measurement of Acid Value>

The basic procedure is in accordance with JIS K-2501-2003.

1) A modified olefin polymer in an amount of about 10 g that is exactly weighed is introduced into a 200 mL tall beaker. Thereto, 150 mL of a mixed solvent as a titration solvent, obtained by mixing xylene and dimethylformamide at 1:1 (volume ratio), is added. As an indicator, several drops of 1 w/v % phenolphthalein ethanol solution (manufactured by Wako Pure Chemical Industries, Ltd.) are added. Then, liquid temperature is increased to 80° C. to dissolve the sample. After the liquid temperature becomes constant at 80° C., titration is carried out by using 2-propanol solution of 0.1 mol/L of potassium hydroxide (manufactured by Wako Pure Chemical Industries, Ltd.), and an acid value is determined from a titration amount.

The equation is:

$$\text{Acid value (mgKOH/g)}=(EP1-BL1)\times FA1\times C1/\text{SIZE}$$

In the above equation, EP1 is a titre (mL); BL1 is a blank value (mL); FA1 is a factor of titrant (1.00), C1 is a value converted in terms of concentration (5.611 mg/mL: equivalent to potassium hydroxide (KOH 1 mL) of 0.1 mol/L); and SIZE is an amount of a sample collected (g).

This measurement is repeated three times to obtain values and an average thereof is defined as an acid value.

The modified olefin polymer (A2) desirably has an acid value of 0.1 to 100 mgKOH/g, more preferably 0.5 to 60 mgKOH/g, and further preferably 0.5 to 30 mgKOH/g. Here, when the graft-modified olefin polymer (A2m) is mixed with the unmodified polymer (A1a) to form a modified olefin polymer composition and this composition is used as the modified olefin polymer (A2), it is preferable that the modified olefin polymer composition as a whole has an acid value described above.

When maleic anhydride is used as the polar group-containing monomer, graft amount can be determined also based on absorption of a carbonyl group of maleic anhydride that is detected at around 1790 cm$^{-1}$ in using an infrared spectrophotometer.

The polymer (A1a) can be graft-copolymerized with at least one kind of polar group-containing monomer selected from the polar group-containing monomers by various methods. For example, the following methods can be mentioned:

the polymer (A1a) is dissolved in an organic solvent, and the polar group-containing monomer and a radical polymerization initiator are added. Then, the resulting mixture is heated and stirred, to allow graft copolymerization reaction to proceed;

the polymer (A1a) is heat-molten, and to the resultant molten product, the polar group-containing monomer and a radical polymerization initiator are added, followed by stirring, to allow graft copolymerization to proceed;

the polymer (A1a), the polar group-containing monomer and a radical polymerization initiator are previously mixed with one another, and the resultant mixture is fed to an extruder, where heat-kneading is performed, to allow graft copolymerization reaction to proceed; and the polymer (A1a) is impregnated with a solution given by dissolving the polar group-containing monomer and a radical polymerization initiator in an organic solvent, and then is heated to a maximum temperature at which the dissolution of an ethylene. α-olefin random copolymer is not caused, to allow graft copolymerization reaction to proceed.

The reaction temperature is 50° C. or higher, particularly preferably 80 to 200° C., and the reaction time is about 1 minute to about 10 hours.

The reaction mode may be either batch mode or continuous mode, but for carrying out graft copolymerization homogenously, batch mode is preferable.

A radical polymerization initiator to be used is not limited as long as being promoting the reaction between the polymer (A1a) and the polar group-containing monomer, but particularly preferred are organic peroxides and organic peresters.

Specific examples include benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroylperoxide, tert-butylperacetate, 2,5-dimethyl-2,5-di(tert-butylperoxy) hexyne-3, 2,5-dimethyl-2,5-di(tert-butylperoxide)hexane, tert-butylbenzoate, tert-butylperphenyl aceatte, tert-butylperisobutyrate, tert-butylper-sec-octoate, tert-butylperpivalate, cumylperpivalate and tert-butylperdiethyl acetate, and other examples include azo compounds, e.g., azobis-isobutylnitrile and dimethylazoisobutylnitrile.

Of these, preferred are dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

It is preferable that the radical polymerization initiator is used in an amount of about 0.001 to 10 parts by weight based on 100 parts by weight of the polymer (A1a).

When the graft-modified olefin polymer (A2m) is mixed with the unmodified polymer (A1a) to form a modified olefin polymer composition and this composition is used as the modified olefin polymer (A2), it is preferable that the composition is prepared such that based on 100 parts by weight of the total of the graft-modified olefin polymer (A2m) and the unmodified polymer (A1a), the polar group-containing monomer for grafting accounts for 0.1 to 15 parts by weight, preferably 0.5 to 10 parts by weight.

The graft reaction may be carried out in an organic solvent or in the absence of a solvent, as described above. In the present invention, when the graft-modified olefin polymer (A2m) itself is used as the modified olefin polymer (A2) for the olefin polymer (A), since a composition given by dissolving the modified olefin polymer (A2) in an organic solvent is generally used as e.g., an adhesive, the graft-modified olefin polymer (A2m) obtained through the reaction in the organic solvent can be used as it is, or the polymer (A2m) given by further adding the same or different kind of organic solvent can be used, for the preparation of e.g., the coating agent. When no organic solvents are used to carry out the graft reaction, an organic solvent is added to dissolve the graft-product for the preparation of e.g., the coating agent of the present invention.

When the graft-modified olefin polymer (A2m), which is a graft-modified product of polymer (A1a), is mixed with the unmodified polymer (A1a) and this mixture is used as the modified olefin polymer (A2), the mixture previously prepared may be used for the preparation of the coating agent, or the mixing procedure may be conducted in a solvent during the preparation of the coating agent.

An organic solvent to be added in order to prepare the coating agent of the present invention during the reaction or after the reaction is not particularly limited. Examples thereof include aromatic hydrocarbons such as benzene, toluene and xylene; aliphatic hydrocarbons such as hexane, heptane, octane and decane; alicyclic hydrocarbons such as cyclohexane, cyclohexene and methylcyclohexane; alcohols such as methanol, ethanol, isopropyl alcohol, butanol, pentanol, hexanol, propanediol and phenol; ketone-based solvents such as acetone, methyl isobutyl ketone, methyl ethyl ketone, pentanone, hexanone, isophorone and acetophenone; cellosolves such as methylcellosolve and ethylcellosolve; esters such as methyl acetate, ethyl acetate, butyl acetate, methyl propionate and butyl formate; halogenated hydrocarbons such as trichloroethylene, dichloroethylene and chlorobenzene. Of these, aromatic hydrocarbons, aliphatic hydrocarbons and ketones are preferable. These may be used singly or in combination of two or more kinds thereof.

By the method described above, the graft-modified olefin polymer (A2m) constituting the modified olefin polymer (A2) is obtained. In the present invention, such a graft-modified olefin polymer (A2m) may be used singly or in combination of two or more kinds thereof.

When the modified olefin polymer (A2) is composed of two or more kinds of the graft-modified olefin polymers (A2m), it is preferable that the modified olefin polymer (A2) is prepared such that the polar group-containing monomer for grafting accounts for 0.1 to 15 parts by weight, preferably 0.5 to 10 parts by weight based on 100 parts by weight of the total of said two or more kinds of the graft-modified olefin polymers (A2m) and the unmodified polymer (A1a) optionally used.

Further, the modified olefin polymer (A2) is, in a preferred embodiment of the present invention, a polymer containing 50 to 100 mol % of structural units derived from propylene and 50 to 0 mol % of structural units derived from α-olefins having 2 to 20 carbon atoms excluding propylene, provided that the total of the structural units derived from α-olefins having 2 to 20 carbon atoms is 100 mol %. Here, preferred examples of the "α-olefins having 2 to 20 carbon atoms excluding propylene" include 1-butene and octene. As a more preferred aspect here, the content of the structural units derived from propylene is preferably 55 to 90 mol %, more preferably 60 to 85 mol %, and still more preferably 60 to 80 mol %, provided that the total of the structural units derived from α-olefins having 2 to 20 carbon atoms is 100 mol %; and the content of the structural units derived from α-olefins having 2 to 20 carbon atoms excluding propylene is preferably 45 to 10 mol %, more preferably 40 to 15 mol %, and still more preferably 40 to 20 mol %.

Thus, said inventive modified olefin polymer (A2) obtained from a polymer which contains structural units derived from α-olefins having 2 to 20 carbon atoms and part or whole of which is graft-modified with a polar group-containing monomer include:

a modified olefin polymer (A2') which contains 0.1 to 15 parts by weight of structural units derived from the polar group-containing monomer based on 100 parts by weight of said modified olefin polymer;

a modified olefin polymer which contains 50 to 100 mol % of structural units derived from propylene and 50 to 0 mol % of structural units derived from α-olefins having 2 to 20 carbon atoms excluding propylene, provided that the total of the structural units derived from α-olefins having 2 to 20 carbon atoms is 100 mol %; and a modified olefin polymer (A2") fulfilling the requirements in terms of both the above-mentioned graft amount and the above-mentioned type and amount of structural units.

Halogenated Olefin Polymer (A3)

Examples of the halogenated olefin polymer (A3) are halogenated olefin polymers obtained from polymers which contain structural units derived from the α-olefins having 2 to 20 carbon atoms and part or whole of which is halogen-modified. For example, in the present invention, a polymer containing structural units derived from α-olefins having 2 to 20 carbon atoms, (A1b), is halogen-modified, and a halogen-modified olefin polymer (A3m) thus obtained can be defined as the halogenated olefin polymer (A3), and this can be used for the olefin polymer (A). Here, examples of the polymer (A1b) may be those given as the polymer (A1).

The polymer (A3) is preferably a polymer which contains structural units derived from α-olefins having 2 to 20 carbon atoms and part or whole of which is halogen-modified, wherein based on the 100 parts by weight of the halogen-modified olefin polymer, the halogen content is 2 to 40 parts by weight.

The polymer (A3) is preferably a propylene-based polymer containing 50 to 100 mol % of structural units derived from propylene and 50 to 0 mol % of structural units derived from α-olefins having 2 to 20 carbon atoms excluding propylene, provided that the total of the structural units derived from α-olefins having 2 to 20 carbon atoms is 100 mol %. Here, preferred examples of the "α-olefin having 2 to 20 carbon atoms excluding propylene" are 1-butene and octene.

Thus, said inventive halogenated olefin polymer (A3) obtained from a polymer which contains structural units derived from α-olefins having 2 to 20 carbon atoms and part or whole of which is halogen-modified include:

a halogen-modified olefin polymer (A3') wherein the halogen content is 2 to 40 parts by weight based on 100 parts by weight of said halogen-modified olefin polymer;

a modified olefin polymer which contains 50 to 100 mol % of structural units derived from propylene and 50 to 0 mol % of structural units derived from α-olefins having 2 to 20 carbon atoms excluding propylene, provided that the total of the structural units derived from α-olefins having 2 to 20 carbon atoms is 100 mol %; and a halogen-modified olefin polymer (A3") fulfilling the requirements in terms of both the amount of halogen modification and the above-mentioned type and amount of structural units.

In addition, the halogenated olefin polymer (A3) may be a mixture of a halogen-modified product of polymer (A1b) described above, i.e., the halogen-modified olefin polymer (A3m), and the unmodified polymer (A1b) that forms a halogen-modified olefin polymer composition. At this time, the polymer (A1b) used for halogen modification for the purpose of obtaining the halogen-modified olefin polymer (A3m) and the polymer (A1b) used without being modified may be the same or different. This embodiment is an example where part of the polymer containing the structural units derived from α-olefins having 2 to 20 carbon atoms is halogen-modified with a polar group-containing monomer.

The weight average molecular weight of the polymer (A1b) employable above is not particularly limited as long as the halogenated olefin polymer (A3) as a whole fulfills the above-mentioned weight average molecular weight, but is generally in the range of $1 \times 10^4$ to $1000 \times 10^4$, preferably $2\times10^4$ or more and $100\times10^4$ or less, and more preferably $3\times10^4$ or more and $50\times10^4$ or less. In addition, the amount of heat of fusion as measured in accordance with JIS K 7122 is not particularly limited as long as the halogenated olefin polymer (A3) fulfills the above-mentioned weight average molecular weight. Since halogenation tends to decrease the amount of heat of fusion, the polymer (A1b) to be used can be selected according to this tendency.

It is preferable that the halogenated olefin polymer (A3) contains 2 to 40 parts by weight of halogen based on 100 parts by weight of the total of the halogen-modified olefin polymer (A3m) and the unmodified polymer (A1b) optionally used.

In the present invention, the halogen-modified olefin polymer (A3m) that is preferably used to constitute the halogenated olefin polymer (A3) may be a chlorinated polyolefin.

The chlorinated polyolefin used in the present invention as the halogen-modified olefin polymer (A3m) is obtained by chlorinating a polyolefin by a known method. Here, the chlorinated polyolefin used as the halogen-modified olefin polymer (A3m) may be further modified with a polar group-containing monomer such as unsaturated carboxylic acids and their anhydrides (for example, maleic anhydride). Examples of commercially-available products that are preferably used are HARDLEN CY-9122P, HARDLEN CY-9124P, HARDLEN HM-21P, HARDLEN M-28P, HARDLEN F-2P and HARDLEN F-6P (product name, each of which is manufactured by TOYOBO CO., LTD.).

The chlorine content proportion of the chlorinated polyolefin is preferably 10% by weight or more and 40% by weight or less, more preferably 20% by weight or more and 30% by weight or less, based on the total of the chlorinated modified olefin polymer used as the halogen-modified olefin polymer (A3m) and the unmodified polymer (A1b) optionally used. The proportion of not more than the above upper limit is preferable because deterioration caused by exposure such as heat, sunlight, ultraviolet and rain is suppressed. The proportion of not less than the above lower limit is preferable because sufficient adhesion is obtained.

In the present invention, the halogen-modified olefin polymer (A3m) may be used singly or in combination of two or more kinds thereof.

The halogen-modified olefin polymer (A3m) can be obtained, for example, by dissolving a polyolefin in a chlorine-based solvent, and then blowing into the solution chlorine gas until the chlorine content proportion accounts for 16 to 35% by weight in the presence or absence of a radical catalyst.

Here, the chlorine-based solvent used as a solvent for chlorination reaction, is for example, tetrachloroethylene, tetrachloroethane, carbon tetrachloride, and chloroform.

The temperature at which the dissolution and chlorination reaction are performed is desirably not less than a temperature at which a polyolefin is dissolved in the chlorine-based solvent.

In the present invention, in the use of the halogenated olefin polymer (A3) as the olefin polymer (A) to prepare the coating agent wherein the halogen modification has been carried out in an organic solvent, the resultant polymer (A3) may be used as it is, or the same kind or different kind of organic solvent is further added to the polymer (A3) before the polymer (A3) is used. Examples of organic solvents employable at this time are the same solvents as those used for the modified olefin polymer (A2).

Further, in the present invention, the olefin polymer (A) may be a combination of two or more kinds selected from the polymer (A1), the modified olefin polymer (A2) and the halogenated olefin polymer (A3).

The olefin polymer (A) to be used in the present invention is preferably selected from the modified olefin polymer (A2) and the halogenated olefin polymer (A3), and is more preferably selected from the modified olefin polymer (A2), among the polymer (A1), the modified olefin polymer (A2) and the halogenated olefin polymer (A3). At this time, the modified olefin polymer (A2) may contain the unreacted polymer (A1a) which has not been graft-modified, as needed.

The olefin polymer (A) used in the present invention preferably has a kinematic viscosity as measured at 40° C. of more than 500000 cSt. Here, the feature that the kinematic viscosity is more than 500000 cSt is a concept that includes cases where the fluidity is too low for the kinematic viscosity to be measured.

The content of the olefin polymer (A) in the coating agent of the present invention is preferably 30 to 88% by weight based on 100% by weight of the total of the olefin polymer (A), a hydrocarbon-based synthetic oil (B) described next, and a tackifier (C) described later.

Hydrocarbon-Based Synthetic Oil (B)

In the present invention, the hydrocarbon-based synthetic oil (B) constituting the coating agent is a hydrocarbon-based synthetic oil having a 40° C. kinematic viscosity of 30 to 500,000 cSt. That is, as the hydrocarbon-based synthetic oil (B), one having a certain fluidity is used in the coating agent of the present invention. The biggest feature of the coating agent according to the present invention is to include the hydrocarbon-based synthetic oil (B) as its constituent component. By virtue of this, as compared with coating agents containing no hydrocarbon-based synthetic oil, improved adhesion to a base material to be decorated is attained, and much more kinds of base materials can be decorated.

The hydrocarbon-based synthetic oil (B) is not particularly limited as long as fulfilling the above-mentioned kinematic viscosity, but preferred examples are polymers of olefins having 2 to 20 carbon atoms. Of these, particularly preferred is an oligomer obtained by homopolymerizing an olefin having 2 to 20 carbon atoms or an oligomer obtained by copolymerizing a mixture composed of any two or more kinds of these olefins. Preferred examples of the olefins having 2 to 20 carbon atoms are ethylene, propylene, 1-butene, 1-octene, 1-decene and 1-dodecene.

Here, the hydrocarbon-based synthetic oil (B) that is preferably used is an ethylene-based copolymer containing structural units derived from ethylene and structural units derived from α-olefins having 3 to 20 carbon atoms. In this case, the amount of the structural units derived from ethylene is 30 to 70 mol %, preferably 40 to 60 mol % based on 100 mol % of the total of the structural units derived from ethylene and the structural units derived from α-olefins having 3 to 20 carbon atoms. When the content of the structural units derived from ethylene is as described above, for example, the formation into a varnish hardly involves solidification at low temperature and thereby the stability of the varnish is improved.

Preferred examples of the α-olefin serving as a copolymerization component of the ethylene-based copolymer are α-olefins having 3 to 20 carbon atoms such as propylene, 1-butene, 1-pentene, 1-hexene, 1-octene, 1-decene, 1-dodecene, 1-tetradecene, 1-hexadecene, 1-octadecene and 4-methyl-1-pentene. Two or more kinds of these may be used. Of these, particularly preferred are α-olefins having 3 to 14 carbon atoms, and further preferred is propylene.

The ethylene-based copolymer as described above can be obtained by polymerizing ethylene and its copolymerization component, an α-olefin, for example, by using as an olefin polymerization catalyst a vanadium compound such as a vanadic acid ester, e.g., dichloridevanadic acid ethyl ester, in the presence of an organoaluminum compound such as ethyl aluminum sesquidichloride. At this time, the polymerization reaction may be carried out in a hydrocarbon medium. Specific examples of the hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aroamtic hydrocarbons such as benzene, toluene and xylene; halogenated hydrocarbons such as ethylene chloride, chlorobenzene and dichloromethane; and petroleum fractions such as gasoline, kerosene and light oil. Further, olefins to be used for polymerization may be used.

In the present invention, polymerization is carried out in the presence of the olefin polymerization catalyst described above. At this time, the vanadium compound is used in such an amount that the concentration of transition metal atoms in the polymerization reaction system is generally $10^{-9}$ to $10^{-1}$ mol, preferably $10^{-8}$ to $10^{-2}$ mol per 1 liter of reaction volume.

The temperature for polymerization of olefins using the olefin polymerization catalyst generally ranges −50 to +200° C., preferably 0 to 180° C. The polymerization pressure generally ranges from normal pressure to 10 MPa gauge pressure, preferably normal pressure to 5 MPa gauge pressure. The polymerization reaction may be carried out in any mode of batch mode, semi-continuous mode and continuous mode. Further, polymerization may be carried out in two or more separate stages differing in reaction conditions. The molecular weight of the resultant olefin polymer can be controlled by allowing hydrogen to be present in the polymerization system or by varying polymerization temperature.

The hydrocarbon-based synthetic oil (B) may be copolymers containing 90 to 100 mol % of structural units derived from α-olefins having 6 to 20 carbon atoms and 10 to 0 mol % of structural units derived from α-olefins having 2 to 5 carbon atoms. Among these, preferred are copolymers containing 90 to 100 mol % of structural units derived from α-olefins having 6 to 16 carbon atoms and 10 to 0 mol % of structural units derived from α-olefins having 2 to 5 carbon atoms: for example, copolymers containing structural units derived from α-olefins having 8 to 12 carbon atoms are one of preferred embodiments.

The copolymer described above can be produced by copolymerizing an α-olefin having 6 to 20 carbon atoms and optionally an α-olefin having 2 to 5 carbon atoms, from polymerization using a Ziegler catalyst, or from cation polymerization, heat polymerization or radical polymerization using Lewis acid as a catalyst.

In the present invention, the hydrocarbon-based synthetic oil (B) used may be liquid polybutene. Liquid polybutene is obtained from the polymerization of a C4 fraction material given through petroleum refining, the polymerization using a catalyst such as aluminum chloride and boron trichloride. Liquid polybutene is a polymer obtained by polymerizing isobutene as a main monomer, its examples including isobutene homopolymer and a copolymer of isobutene and n-butene. These are readily commercially available: examples are Nisseki Polybutene and Tetrax manufactured by JX Nippon Oil & Energy Corporation. Specific production process of liquid polybutene is described in Encyclopedia of Polymer Science and Engineering (2nd edition) Vol. 8 p 432 (John Wiley & Sons).

These hydrocarbon-based synthetic oils (B) described above may be used singly or in combination of two or more kinds thereof.

The hydrocarbon-based synthetic oil (B) used in the present invention has a 40° C. kinematic viscosity of 30 cSt or more and 500,000 cSt or less, preferably 300 cSt or more and 400,000 cSt or less, more preferably 5,000 cSt or more and 300,000 cSt or less. When the lower limit of the kinematic viscosity of the hydrocarbon-based synthetic oil (B) is higher, adhesion at the time of coating procedure tends to be much superior.

The content of the hydrocarbon-based synthetic oil (B) in the coating agent of the present invention is 6 to 30% by weight based on 100% by weight of the total of the olefin polymer (A), the hydrocarbon-based synthetic oil (B), and a tackifier (C) described later. When the content of the hydrocarbon-based synthetic oil (B) is within the above range, adhesion tends to be superior and stability over time also tends to be superior, which is advantageous.

The addition amount of the hydrocarbon-based synthetic oil (B) used in the present invention is, when the oil (B) has a 40° C. kinematic viscosity of less than 2,000 cSt, as follows: based on 100% by weight of the total of the olefin polymer (A) and the hydrocarbon-based synthetic oil (B), the hydrocarbon-based synthetic oil (B) preferably accounts for 40% by weight or less, more preferably 35% by weight or less, still more preferably 25% by weight or less. In this case, the lower limit of the addition amount is preferably 2% by weight, more preferably 3% by weight based on 100% by weight of the total of the olefin polymer (A) and the hydrocarbon-based synthetic oil (B).

When the 40° C. kinematic viscosity is 2,000 cSt or more and 100,000 cSt or less, the hydrocarbon-based synthetic oil (B) preferably accounts for 70% by weight or less, preferably 60% by weight or less, still more preferably 40% by weight or less, based on 100% by weight of the total of the olefin polymer (A) and the hydrocarbon-based synthetic oil (B). In this case, the lower limit of the addition amount is preferably 1% by weight, more preferably 2% by weight, still more preferably 3% by weight, based on 100% by weight of the total of the olefin polymer (A) and the hydrocarbon-based synthetic oil (B).

When the 40° C. kinematic viscosity is 100,000 cSt or more and 500,000 cSt or less, the hydrocarbon-based synthetic oil (B) preferably accounts for 75% by weight or less, preferably 70% by weight or less, 60% by weight or less, based on 100% by weight of the total of the olefin polymer (A) and the hydrocarbon-based synthetic oil (B). In this case, the lower limit of the addition amount is preferably 3% by weight, more preferably 5% by weight, still more preferably 10% by weight, based on 100% by weight of the total of the olefin polymer (A) and the hydrocarbon-based synthetic oil (B).

When the addition amount is as described above, the coating film strength is particularly good and the adhesion is also particularly good.

Further, the hydrocarbon-based synthetic oil (B) used in the present invention can be modified e.g., by being grafted with various vinyl compounds. Examples of the vinyl compound include styrenes such as styrene and α-methylstyrene; acrylic esters such as methyl acrylate, butyl acrylate, and octyl acrylate; methacrylic esters such as methyl methacrylate and butyl methacrylate; carboxyl group-containing vinyl compounds such as acrylic acid, metaacrylic acid, cinnamic acid, maleic acid, maleic anhydride, fumaric acid, itaconic acid, and monoethyl maleate; diesters of unsaturated dibasic acids such as dimethyl fumarate and dibutyl fumarate; glycidyl group-containing vinyl compounds such as glycidyl acrylate, β-methylglycidyl acrylate, glycidyl methacrylate, and β-methylglycidyl methacrylate; hydroxyl group-containing vinyl compounds such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate, and 2-hydroxy-3-phenoxypropyl acrylate; unsaturated carboxylic acids such as acrylonitrile, methacrylonitrile, and cinnamic acid; acrylamide, methacrylamide, N-substituted acrylamide, N-substituted methacrylamide, and acrylamido propanesulfonic acid. The vinyl compound may be used singly or in combination of two or more kinds thereof.

When good compatibility is achieved between the olefin polymer (A) and the hydrocarbon-based synthetic oil (B), it is believed that the crystallization rate of the olefin polymer (A) is decreased and this improves adhesion to an adherend interface. This is believed to result in the exhibition of adhesion inherent in the olefin polymer (A) to olefin resins, polar group-containing resins and metals.

Particularly, when the olefin polymer (A) is the modified olefin polymer (A2) and/or the halogenated olefin polymer (A3), the presence of the hydrocarbon-based synthetic oil (B) increases the adhesion strength with respect to a base material. Reasons for this are not definite, but a possible explanation is as follows: the presence of the hydrocarbon-based synthetic oil (B) makes molecules having polar groups or a halogen atom of the olefin polymer (A) readily movable; and when a base material, for example, contains e.g., a hetero atom or is a metal, the polar group or the halogen atom is readily localized to parts contacting with the base material, thereby leading up to high adhesion strength.

Further, higher kinematic viscosity of the hydrocarbon-based synthetic oil (B) leads to a tendency of higher adhesion strength. Reasons for this are not definite, but a possible explanation is that the use of a material having higher kinematic viscosity as the hydrocarbon-based synthetic oil (B) prevents the hydrocarbon-based synthetic oil (B) from bleeding out from a dry coating film. It is believed in this case that the loss of the effect resulting from adding the hydrocarbon-based synthetic oil (B) (imparting plasticity and making molecules having a polar group or a halogen atom easy to move) that is caused by bleed-out is more reduced, and that lowered adhesion caused by the formation of a layer composed only of the hydrocarbon-based synthetic oil (B) on the surface of the olefin polymer (A) is more reduced. The higher kinematic viscosity of the hydrocarbon-based synthetic oil (B) is thereby presumed to more reduce the adverse effect caused by bleed-out and provide superb balance.

Further, from the observation that the hydrocarbon-based synthetic oil (B) is difficult to bleed-out, it is believed that adhesion strength can be stable for a long period of time between a coating film composed of the coating agent and an adherend, and that high adhesion strength is achieved also when a film formed from the coating agent is not used for adhesion purpose immediately after its formation and instead used for adhesion purpose after the passage of some time from its formation.

Tackifier (C)

The coating agent of the present invention contains a tackifier (C) together with the olefin polymer (A) and the hydrocarbon-based synthetic oil (B). The biggest feature of the coating agent according to the present invention is to include the tackifier (C) as its constituent component. By virtue of this, as compared with coating agents containing no tackifiers, improved adhesion to abase material to be decorated is attained. At the same time, also attained is an effect of enabling much more kinds of base materials to be decorated. The effect of enabling much more kinds of base materials to be decorated, which effect is ascribed to inclusion of the tackifier (C), may be more notably exhibited in particular when a curing agent (D) described later is further included in combination.

Here, the tackifier (C) used in the present invention has an acid value of 10 or more and preferably 10 to 40, which acid value is determined in accordance with JIS K 0070. When the acid value of the tackifier used as the tackifier (C) is in such a range, it is advantageous in that, when the coating agent is applied to form a film, affinity for an adherend improves and sufficient adhesion is attained. It is to be noted that this acid value is practically a value expressed in the number of milligrams of potassium hydroxide required to neutralize an/the acid or the like contained in one gram of a sample.

Further, the tackifier (C) used in the present invention has a weight average molecular weight (Mw) as measured by GPC of $0.9 \times 10^3$ to $3 \times 10^3$; and the lower limit value of Mw is preferably $1 \times 10^3$. In a preferred aspect the present invention, the weight average molecular weight of the tackifier (C) is therefore $1 \times 10^3$ to $3 \times 10^3$. When the weight average molecular weight of the tackifier used as the tackifier (C) is in the above range, it is advantageous in that, when the coating agent is applied to form a film, good compatibility with the olefin polymer (A) and the hydrocarbon-based synthetic oil (B) is ensured and good stability over time and sufficient adhesion are attained.

The tackifier (C) is not particularly limited as long as the he tackifier (C) has the acid value and weight average molecular weight described above. Note that examples of types of components that may constitute the tackifier (C) include terpene resins; modified terpene resins such as terpene phenol copolymer resins and aromatic modified terpene resins; and rosin resins such as rosin esters and modified rosin resins. Of these, rosin esters and derivatives thereof are preferred. Here, examples of the derivative of rosin ester include polymerized rosin esters, hydrogenated rosin esters, rosin modified maleic resins, special rosin esters, and rosin modified special synthetic resins. Of these, those having the acid value and weight average molecular weight described above can be employed as the tackifier (C) in the present invention; and specific examples thereof include Haritack 4821, Haritack PCJ, and Haritack FK125 (all of which are manufactured by Harima Chemicals, Inc.), and Pensel (registered trademark) C, Pensel (registered trademark) D-125, and Super Ester A-125 (all of which are manufactured by Arakawa Chemical Industries, Ltd.). In addition, the specific example can also include Super Ester W-125 and Pinecrystal (registered trademark) KE-359 (manufactured by Arakawa Chemical Industries, Ltd.), and Sylvalite RE100L and Sylvalite RE105L (all of which are manufactured by Arizona Chemical.)

The content of the tackifier (C) in the coating agent of the present invention is 6 to 40% by weight based on 100% by weight of the total of the olefin polymer (A), the hydrocarbon-based synthetic oil (B), and a tackifier (C). When the content of the tackifier (C) is within the above range, sufficient adhesion tends to be certainly provided, which is advantageous.

That is, in the present invention, provided that the total of the olefin polymer (A), the hydrocarbon-based synthetic oil (B), and the tackifier (C) is 100% by weight, the olefin polymer (A) accounts for 30 to 88% by weight; the hydrocarbon-based synthetic oil (B) accounts for 30 to 6% by weight; and the tackifier (C) accounts for 40 to 6% by weight.

It is to be noted that, when it comes to components fulfilling the requirement of being the tackifier (C) and concurrently fulfilling the requirement of being the above hydrocarbon-based synthetic oil (B), the component is, in the present invention, regarded as not being the tackifier (C), but being the hydrocarbon-based synthetic oil (B).

Curing Agent (D)

The coating agent of the present invention may further include, together with the above olefin polymer (A), the above hydrocarbon-based synthetic oil (B), and the tackifier (C), a curing agent (D) as needed. Here, having the curing agent (D), the coating agent of the present invention has advantages of improved coating film strength and excellent adhesion, heat resistance, and chemical resistance.

The curing agent is not particularly limited; and examples thereof can include polyisocyanate monomers and modified polyisocyanates.

Of these, the polyisocyanate monomer is a monomer compound that has multiple isocyanate groups in one molecule; and examples of such a polyisocyanate monomer include aromatic polyisocyanates, aromatic and aliphatic polyisocyanates, and aliphatic polyisocyanates.

Examples of the aromatic polyisocyanate here include aromatic diisocyanates such as tolylene diisocyanate (2,4- or 2,6-tolylene diisocyanate or a mixture thereof) (TDI), phenylene diisocyanate (m-, p-phenylene diisocyanate or a mixture thereof), 4,4'-diphenyl diisocyanate, 1,5-naphthalene diisocyanate (NDI), diphenylmethane diisocyanate (4,4'-, 2,4'- or 2,2'-diphenylmethane diisocyanate or a mixture thereof) (MDI), 4,4'-toluidine diisocyanate (TODI), and 4,4'-diphenylether diisocyanate.

Examples of the aromatic and aliphatic polyisocyanate include aromatic and aliphatic diisocyanates such as xylylene diisocyanate (1,3- or 1,4-xylylene diisocyanate or a mixture thereof) (XDI), tetramethylxylylene diisocyanate (1,3- or 1,4-tetramethylxylylene diisocyanate or a mixture thereof) (TMXDI), and ω,ω'-diisocyanate-1,4-diethyl benzene.

Examples of the aliphatic polyisocyanate include aliphatic diisocyanates such as trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), 1,5-pentamethylene diisocyanate (PDI), 1,6-hexamethylene diisocyanate (HDI), 2,4,4- or 2,2,4-trimethylhexamethylene diisocyanate, and 2,6-diisocyanatemethyl caproate.

Further, the aliphatic polyisocyanate includes alicyclic polyisocyanates. Examples of the alicyclic polyisocyanate include alicyclic diisocyanates such as 1,3-cyclopentane diisocyanate, 1,3-cyclopentene diisocyanate, cyclohexane diisocyanate (1,4-cyclohexane diisocyanate, 1,3-cyclohexane diisocyanate), 3-isocyanatomethyl-3,5,5-trimethylcyclohexyl isocyanate (isophorone diisocyanate) (IPDI), methylenebis(cyclohexyl isocyanate) (4,4'-, 2,4'-, or 2,2'-methylenebis(cyclohexyl isocyanate), a trans, trans-isomer, a trans, cis-isomer, or a cis, cis-isomer thereof, or a mixture thereof) ($H_{12}$MDI), methylcyclohexane diisocyanate (methyl-2,4-cyclohexane diisocyanate, methyl-2,6-cyclohexane diisocyanate), norbornane diisocyanate (various isomers or a mixture thereof) (NBDI), and bis(isocyanatomethyl)cyclohexane (1,3-, or 1,4-bis(isocyanatomethyl) cyclohexane, or a mixture thereof) ($H_6$XDI).

These polyisocyanate monomers can be used singly or in combination of two or more kinds thereof.

Meanwhile, examples of the modified polyisocyanate include modified products yielded by a reaction among the polyisocyanate monomers described above and modified products yielded by a reaction between the polyisocyanate monomer described above and another compound; and modified polyisocyanates having an average number of functional groups of more than two can usually be used. The term "another compound" here refers to a compound other than the polyisocyanate monomer described above and capable of reacting with the polyisocyanate monomer described above; and examples thereof include compounds having an active hydrogen such as monohydric alcohol (hereinafter referred to as "mono-ol"), polyhydric alcohol (hereinafter referred to as "polyol"), amine, and water; and carbon dioxide.

Examples of mono-ols that can be used here in the present invention include butanol, pentanol, hexanol, heptanol, octanol, nonanol, decanol, undecyl alcohol, dodecyl alcohol (lauryl alcohol), tridecyl alcohol, tetradecyl alcohol (myristyl alcohol), pentadecyl alcohol, hexadecyl alcohol (cetyl alcohol), heptadecyl alcohol, octadecyl alcohol (stearyl alcohol, octadecanol), nonadecyl alcohol, and isomers thereof (including 2-methyl-1-propanol (iso-butanol)), and, in addition, other alkanols (C20 alcohol to C50 alcohol); alkenyl alcohols such as oleyl alcohol; alkadienols such as octadienol; and aliphatic mono-ols such as polyethylene butylene mono-ol. In addition, examples of the mono-ol include alicyclic mono-ols such as cyclohexanol and methylcyclohexanol and aromatic and aliphatic mono-ols such as benzyl alcohol.

Further, examples of polyols that can be used in the present invention include compounds having two or more hydroxyl groups that are commonly used in the field of urethane resin; and the polyol may be in the form of monomers or may be in the form of polymers.

Of those, examples of the polyol in the form of monomers include dihydric alcohols such as alkylene glycols such as ethylene glycol and propylene glycol; cyclohexanediol, cyclohexanedimethanol, and benzenedimethanol;

trihydric alcohols such as glycerin, trimethylolmethane, trimethylolethane, and trimethylolpropane; and alcohols having four or more hydroxyl groups such as pentaerythritol, dipentaerythritol. It is to be noted that such a polyol in the form of monomers may be referred to as "low molecular weight polyol" in the present specification.

Meanwhile, examples of the polyols in the form of polymers include polymer polyols that are commonly used in the field of urethane resin such as polyester polyol and polyether polyol.

Specific examples of the modified polyisocyanate include the multimers, allophanate-modified products, polyol-modified products, biuret-modified products, urea-modified products, oxadiazinetrione-modified products, carbodiimide-modified products, uretdione-modified products, and uretonimine-modified products of the polyisocyanate monomers described above.

Here, examples of the multimer include a dimer, a trimer, a pentamer, and a heptamer of the polyisocyanate monomer. Of these, the trimer of the polyisocyanate monomer is exemplified by modified isocyanurate and modified iminooxadiazinedione.

Further, examples of the allophanate-modified product include allophanate-modified products generated by a reaction between the polyisocyanate monomer and the mono-ol (for example, the mono-ol exemplified above such as octadecanol).

Examples of the polyol-modified product include polyol-modified products (alcohol adducts) generated by a reaction between the polyisocyanate monomer and a low molecular weight polyol (such as, for example, trihydric alcohol).

Examples of the biuret-modified product include biuret-modified products generated by a reaction between the polyisocyanate monomer and water or amines.

Examples of the urea-modified product include urea-modified products generated by a reaction between the polyisocyanate monomer and diamines.

Examples of the oxadiazinetrione-modified product include oxadiazinetrione generated by a reaction between the polyisocyanate monomer and carbon dioxide gas.

Examples of the carbodiimide-modified product include carbodiimide-modified products generated by a decarboxylation condensation reaction of the polyisocyanate monomer.

Further, examples of the modified polyisocyanate include, in addition to those described above, polymethylene polyphenyl polyisocyanates (crude MDI and polymeric MDI).

Of those polyisocyanate monomers and modified polyisocyanates described above, the aliphatic polyisocyanate and multimers thereof are in particular preferably used in the present invention. That is, in a preferred aspect of the present invention, the curing agent (D) is the aliphatic polyisocyanate or the multimer of the aliphatic polyisocyanate.

These may be used singly or in combination of two or more kinds thereof.

When the coating agent of the present invention contains the curing agent (D), the addition amount of the curing agent (D) preferably 2 to 30 parts by weight, provided that the total of the olefin polymer (A), the hydrocarbon-based synthetic oil (B), and the tackifier (C) is 100 parts by weight.

Solvent

The coating agent of the present invention may further include, together with the olefin polymer (A), the hydrocarbon-based synthetic oil (B), and the tackifier (C), a solvent as needed.

The solvent is not particularly limited; and examples thereof include aromatic hydrocarbons such as benzene, toluene, and xylene; aliphatic hydrocarbons such as hexane, heptane, octane, and decane; alicyclic hydrocarbons such as cyclohexane, cyclohexene, and methylcyclohexane; alcohols such as methanol, ethanol, isopropyl alcohol, butanol, pentanol, hexanol, propanediol, and phenol; ketone-based solvents such as acetone, methyl isobutyl ketone (MIBK), methyl ethyl ketone (MEK), pentanone, hexanone, isophorone, and acetophenone; cellosolves such as methyl cellosolve and ethyl cellosolve; esters such as methyl acetate, ethyl acetate, butyl acetate, methyl propionate, and butyl formate; halogenated hydrocarbons such as trichloroethylene, dichloroethylene, and chlorobenzene; and petroleum solvents such as Exxsol and Isoper. Of these, toluene, methylcyclohexane/MIBK mixed solvent, methylcyclohexane/MEK mixed solvent, methylcyclohexane/ethyl acetate mixed solvent, cyclohexane/MEK mixed solvent, cyclohexane/ethyl acetate mixed solvent, Exxsol/cyclohexanone mixed solvent, mineral spirits/cyclohexanone mixed solvent are preferably used. Further, a solvent dispersed in e.g., water, may be used.

These may be used singly or in combination of two or more kinds thereof.

When the coating agent of the present invention contains a solvent, the total amount of the olefin polymer (A), the hydrocarbon-based synthetic oil (B), and the tackifier (C) is generally about 5 to 50% by weight and preferably 8 to 40% by weight, provided that the total of the olefin polymer (A), the hydrocarbon-based synthetic oil (B), the tackifier (C), and the solvent is 100% by weight. That is, the addition amount of solvent that may compose the coating agent of the present invention is usually 100 to 1900 parts by weight and preferably 150 to 1150 parts by weight, provided that the total of the olefin polymer (A), the hydrocarbon-based synthetic oil (B), and the tackifier (C) is 100 parts by weight.

Other Constituting Components

The coating agent of the present invention may contain other olefin resin (E) together with the olefin polymer (A), the hydrocarbon-based synthetic oil (B), and the above tackifier (C). Said "other olefin resin (E)" is not particularly limited unless being any of the olefin polymer (A) and the hydrocarbon-based synthetic oil (B); and examples thereof include homopolymers of polyethylene, polypropylene, poly-1-butene, poly-4-methyl-1-pentene; random or block copolymers composed from α-olefins such as ethylene, propylene, and 4-methyl-1-pentene; ethylene.propylene copolymer, ethylene.octene copolymer, propylene.octene copolymer, ethylene.propylene.1-butene copolymer, ethylene.propylene.terpolymer, cyclic polyolefins, ethylene.vinyl acetate, copolymers of ethylene.unsaturated carboxylic acid, ethylene.vinyl alcohol, and ionomer resins.

Further, as needed, additives for coating materials may be added: for example, transition metal compounds such as titanium oxide (rutile-type) and zinc oxide, pigments such as carbon black, thixotropic agents, thickening agents, other tackifiers that do not fall under the tackifier (C) (hereinafter referred to as "other tackifier"), defoaming agents, surface regulating agents, anti-settling agents, antioxidants, weathering agents, heat stabilizers, light stabilizers, pigment-dispersing agents, and antistatic agents. Here, as said "other tackifier", those that do not fall under the tackifier (C) can be employed from, for example, terpene resins; modified terpene resins such as terpene phenol copolymer resin, aromatic modified terpene resin, and hydrogenated terpene resin; aliphatic saturated hydrocarbon resins (Arkon manufactured by Arakawa Chemical Industries, Ltd.); high-grade hydrocarbon resins (FTR series manufactured by Mitsui Chemicals, Inc.); rosin modified phenol resins, and rosin resins such as rosin ester and modified rosin resin.

The addition of said other olefin resin (E) and additives for coating materials including transition metal compounds such as titanium oxide (rutile-type) and zinc oxide, pigments such as carbon black, thixotropic agents, thickening agents, the above-mentioned "other tackifiers", defoaming agents, surface regulating agents, anti-settling agents, antioxidants, weathering agents, heat stabilizers, light stabilizers, pigment-dispersing agents, antistatic agents can be generally carried out in a range which is not detrimental to the object of the coating agent of the present invention.

For example, when said other olefin resin (E) is added, its amount is preferably more than 0 and 50 parts by weight or less, more preferably 1 to 30 parts by weight, still more preferably 1 to 10 parts by weight, based on 100 parts by weight of the olefin polymer (A).

In an embodiment, said other olefin resin (E) is not contained.

[Uses]

The coating agent of the present invention is used preferably as a primer, a coating material, a hot melt adhesive, and an optical transparent double-sided tape. When the coating agent of the present invention is used as the primer, the coating material, and the hot melt adhesive, thermoplastic resins such as acrylic resin, PET, polycarbonate, ABS, COC, vinyl chloride, polypropylene, surface treatment polyethylene, and polystyrene, and metal materials such as aluminum, copper, and SUS can be used as an adherend. To be specific, the coating agent of the present invention can be used by being coated on injection molded articles or films of these thermoplastic resins, or articles or metal foils of these metals and dried, followed by further coating of another coating agent on the resultant coating film or by lamination of a film or an article of another thermoplastic resin and a metal foil or an article of a metal on the resultant coating film.

A method for forming a coating film of the coating agent of the present invention is not particularly limited and can be a known one. For example, coating procedure is carried out by methods such as, for example, die coating, flow coating, spray coating, bar coating, gravure coating, gravure reverse coating, kiss reverse coating, microgravure coating, roll coating, blade coating, rod coating, roll doctor coating, air knife coating, comma roll coating, reverse roll coating, transfer roll coating, kiss-roll coating, curtain coating and dipping coating. This is followed by appropriate drying such as natural drying or heat forcible drying. Thereby, a coating film can be obtained.

The decorative film of the present invention has no particular limitation, as long as having a layer obtained from the coating agent of the present invention and this layer is combined with a known design film. For example, a film previously decorated by e.g., printing, coating, deposition, or a decorated film formed by combining such a film, which is defined as a design layer, is laminated with the layer obtained from the coating agent of the present invention.

In other words, the decorative film of the present invention has at least one layer obtained from the above-described coating agent of the present invention. In a typical embodiment, the decorative film of the present invention has a design layer formed from a design film such as a film previously decorated by e.g., printing, coating, depositing, and also has the layer obtained from the above-described coating agent of the present invention, which layer, hereinafter in the present Description, is sometimes called the "coating film" when its form is focused on, and is sometimes called the "bonding layer" when its function is focused on.

Here, examples of a material of a film having the design layer include thermoplastic films such as an acryl film, a PET film, a polycarbonate film, a COC film, a vinyl chloride film, and a cast polypropylene (hereinafter referred to as "CPP") film; and deposited films in which a metal such as aluminum was vapor deposited on the above thermoplastic film.

A production process of the decorative film of the present invention is not particularly limited as long as the decorative film is provided with a layer (coating film) obtained from the coating agent of the present invention. Specifically, the following methods can be mentioned, for example: a method in which the coating film of the present invention is dry-laminated on a side of a decorative film having a design layer, wherein the side is to be faced with an adherend; a method in which the coating film of the present invention is provided directly with the design layer by e.g., printing; and a method in which on the above film, a clear layer, a coating material layer and the layer formed from the coating film of the present invention (that is, the layer obtained from the coating agent of the present invention) are sequentially formed by e.g., printing.

Regarding the decorative film having the coating film of the present invention, for example, by utilizing an existing vacuum forming method such as a vacuum forming method and a pressure vacuum forming method, an insert molding method and an in-mold molding method, or TOM technique using a "vacuum forming apparatus" described in JP-B-3733564, an article with complicated three-dimensional structure can be decorated.

Preferred examples of an adherend of the decorative film used in the present invention include polyolefin materials such as PP, HIPS, PS, ABS, PC, a PC.ABS alloy, PET, an acrylic resin, metal materials such as an ED steel plate, a Mg alloy, SUS, an aluminum alloy, and glass. The adherend may also be a composite of the resin described above and the metal material described above.

An article obtained by the decorating method can be favorably used for applications including automobile interior/exterior parts; various front panels for audio visual systems; surface decorative materials such as buttons and emblems; various parts, e.g., case bodies, housings, display windows and buttons, of e.g., mobile phones; exterior materials for furniture; interior materials for architecture such as bath rooms, wall surfaces, ceilings and floors; exterior materials for architecture such as exterior walls, e.g., sidings, fences, roofs, doors and barge boards; surface decorative materials for furniture such as window frames, doors, handrails, thresholds and lintels; optical materials such as various displays, lenses, mirrors, goggles and window glasses; interior/exterior parts of various vehicles other than automobiles, such as trains, air planes and ships; and various packaging containers such as bottles, containers for cosmetics and accessory cases, packaging materials, sundries such as free gifts and small items and other various uses.

EXAMPLES (Measurement of Propylene Content and Ethylene Content)
Propylene content and ethylene content were determined by $^{13}$C-NMR.

(Measurement of Melting Point and Amount of Heat of Fusion)
The melting point and the amount of heat of fusion were determined by using a differential scanning calorimeter (DSC-Q1000, manufactured by TA Instruments). In a process composed of increasing temperature at 10° C./min from 30° C. to 180° C., maintaining the temperature at 180° C. for 3 minutes, and then decreasing the temperature at 10° C./min to 0° C., and thereafter increasing temperature again at 10° C./min to 150° C., thermogram obtained at the time of the second temperature-increase was used to measure a melting point and an amount of heat of fusion in accordance with JIS K 7122.

(Measurement of 40° C. Kinematic Viscosity)
In accordance with ASTM D 445, the measurement was carried out.

(Measurement of Weight Average Molecular Weight (Mw) and Molecular Weight Distribution (Mw/Mn))
The molecular weight and molecular weight distribution of the olefin polymer (A) and the hydrocarbon-based synthetic oil (B) were measured by using gel permeation chromatography (LC-10 series, manufactured by Shimadzu Corporation) under conditions described below.

Detector: C-R4A, manufactured by Shimadzu Corporation
Column: TSKG 6000H-TSKG 4000H-TSKG 3000H-TSKG 2000H (manufactured by Tosoh Corporation)
Mobile layer: tetrahydrofuran
Temperature: 40° C.
Flow rate: 0.8 ml/min By using a calibration curve prepared from monodispersion standard polystyrene, Mw and Mw/Mn were calculated.
(Measurement of Graft Amount of Polar Group-Containing Monomer)

The measurement was carried out in accordance with $^1$H-NMR.
(Chlorine Content)

In accordance with JIS K 7229, the chlorine content was determined from the following equation.

Chlorine content (% by mass)={$(A-B) \times F$}/$S \times 100$

A: amount of 0.0282 N aqueous silver nitrate solution (ml) required for titration of sample
B: amount of 0.0282 N aqueous silver nitrate solution (ml) required for titration of blank sample
F: Titer of 0.0282 N aqueous silver nitrate solution
S: mass of sample (mg)
(Tackifiers Used)

(C-1) to (C-13) shown in Table 1 below were employed as tackifiers used in the following Examples and Comparative Examples.

Here, the acid value for each of the tackifiers in the Table 1 below is a value that was determined in accordance with JIS K 0070 and expressed in the number of milligrams of potassium hydroxide required to neutralize the acid or the like contained in one gram of a sample. Further, the weight average molecular weight (Mw) is a value determined in accordance with a method as described in the above "Measurement of weight average molecular weight (Mw) and molecular weight distribution (Mw/Mn)".

It is to be noted that the term "determination" with regard to the acid value and the weight average molecular weight (Mw) indicates whether or not each of the values of each tackifier satisfies a numerical range defined in the present invention.

(Curing Agent Used)
In the following Examples and Comparative Examples, a trimer of 1,6-hexamethylene diisocyanate (HDI trimer) was used as curing agent (D-1).

Production Example 1-1: Synthesis of Propylene/1-Butene Copolymer

To a 2 L autoclave that had been sufficiently purged with nitrogen, 900 ml of hexane and 90 g of 1-butene were introduced. This was followed by adding 1 mmol of triisobutylaluminum, and temperature was increased to 70° C. Thereafter, propylene was fed so that the total pressure was 7 kg/cm$^2$G, and 0.30 mmol of methylaluminoxane and 0.001 mmol in terms of Zr atom of rac-dimethylsilyene-bis{1-(2-methyl-4-phenylindenyl)}zirconium dichloride were added. With propylene continuously fed so that the total pressure was kept at 7 kg/cm$^2$G, polymerization was carried out for 30 minutes. After the polymerization, deaeration was carried out. Then, a polymer was collected in a large amount of methanol, and the polymer collected was vacuum dried at 110° C. for 12 hours. The resultant propylene/1-butene copolymer (low-crystalline olefin resin A-1) had a melting point of 78.3° C., a heat of fusion of 29.2 J/g, Mw of 330,000, and a propylene content of 67.2 mol %.

Production Example 1-2: Synthesis of Maleic Anhydride-Modified Propylene/1-Butene Copolymer 3 kg of the propylene/1-butene copolymer (low-crystalline olefin resin A-1) was added to 10 L of toluene. Under nitrogen atmosphere, temperature was increased to 145° C. to allow the copolymer to be dissolved in toluene. Further, under stirring, 382 g of maleic anhydride, and 175 g of di-tert-butyl peroxide were fed into the system over 4 fours, subsequently followed by stirring at 145° C. for 2 hours. After cooling, a large amount of acetone was introduced to allow the modified copolymer to precipitate. The copolymer was filtered, washed with acetone and vacuum-dried.

TABLE 1

| | Type | Manufacturer | Brand name | | Acid value mgKOH/g | Determination | Mw Value | Determination |
|---|---|---|---|---|---|---|---|---|
| C-1 | Rosin ester | Harima Chemicals, Inc. | Haritack | 4821 | 28.0 | ○ | 1,360 | ○ |
| C-2 | | | Haritack | 28JA | 35.0 | ○ | 4,500 | x |
| C-3 | | | Haritack | F105 | 16.9 | ○ | 860 | x |
| C-4 | | | Haritack | PCJ | 14.6 | ○ | 1,520 | ○ |
| C-5 | | | Haritack | FK125 | 17.2 | ○ | 1,750 | ○ |
| C-6 | | Arakawa Chemical Industries, Ltd. | Pensel | C | 10.6 | ○ | 1,500 | ○ |
| C-7 | | | Pensel | D-125 | 12.3 | ○ | 1,440 | ○ |
| C-8 | | | Super Ester | A-100 | 2.8 | x | 710 | x |
| C-9 | | | Super Ester | A-125 | 14.8 | ○ | 1,660 | ○ |
| C-10 | | | Pinecrystal | KE-311 | 7.1 | x | 650 | x |
| C-11 | Terpene resin | Yasuhara Chemical Co., Ltd. | Clearon | M-115 | 0.4 | x | 1,140 | ○ |
| C-12 | Rosin ester | Arakawa Chemical Industries, Ltd. | Super Ester | W-125 | 14.3 | ○ | 2,539 | ○ |
| C-13 | | Arizona Chemical | Sylvalite | RE100L | 12.0 | ○ | 1,009 | ○ |

The resultant maleic anhydride-modified propylene/1-butene copolymer (low-crystalline olefin resin A-2) had a melting point of 75.8° C., a heat of fusion of 28.6 J/g, Mw of 110,000, and had 1 part by weight of a graft amount of maleic anhydride based on 100 parts by weight of the modified copolymer.

Production Example 2-1: Synthesis of Ethylene/Propylene Copolymer

To a continuous-polymerization reaction vessel with a stirring blade that had been sufficiently purged with nitrogen, one liter of hexane dehydrated and purified was added, and 500 ml/h of a hexane solution of ethylaluminumsesquichloride ($Al(C_2H_5)_{1.5}Cl_{1.5}$) controlled to account for 96 mmol/L was continuously fed for one hour. Further, 500 ml/h of a hexane solution of $VO(OC_2H_5)Cl_2$ controlled to account for 16 mmol/1 as a catalyst and 500 ml/h of hexane were continuously fed. Meanwhile, a polymerization liquid was continuously discharged from the upper part of the polymerization vessel such that a polymerization liquid was always kept present in an amount of one liter in the polymerization vessel. Then, 47 L/h of ethylene gas, 47 L/h of propylene gas, and 20 L/h of hydrogen gas were fed by using a bubbling tube. With a refrigerant circulated through a jacket attached to the outside of the polymerization vessel, a copolymerization reaction was carried out at 35° C. The resultant polymerization solution was, after decalcified with hydrochloric acid, introduced into a large amount of methanol to precipitate, followed by drying under reduced pressure at 130° C. for 24 hours.

The resultant ethylene/propylene copolymer (hydrocarbon-based synthetic oil B-1) had an ethylene content of 55.9 mol %, a 40° C. kinematic viscosity of 37,500 cSt, and a molecular weight distribution (Mw/Mn) of 1.9.

Example 1

In 400 g of toluene, 72 g of low-crystalline olefin resin A-2, 18 g of hydrocarbon-based synthetic oil B-1, and 10 g of the tackifier C-1 were dissolved to give an adhesive varnish. The adhesive varnish prepared was applied on a vinyl chloride resin film (100 μm in thickness) and dried at 80° C. for 10 minutes to give a coating film of a dry film thickness of 20 μm. The resultant vinyl chloride resin film with the coating film (adhesive layer) was press-contacted on a high impact polystyrene (HIPS) adherend (manufactured by Testpiece Co., Ltd.; 25×50×2 mm) by using a heat sealer (TP-701-B manufactured by Tester Sangyo Co., Ltd.) under the conditions of 150° C., 0.3 MPa, and 20 seconds.

The resultant sample piece was allowed to stand still at room temperature overnight and was then notched in a strip form of one centimeter in width by using a cutter. By using Autograph (AGS-500B manufactured by Shimadzu Corporation), the vinyl chloride resin film was peeled under conditions of 180° and 100 mm/min to measure peel strength.

Example 2

Example 1 was repeated except that the tackifier C-1 was replaced with the tackifier C-4, and peel strength was measured.

Example 3

Example 1 was repeated except that the tackifier C-1 was replaced with the tackifier C-5, and peel strength was measured.

Example 4

Example 1 was repeated except that 72 g of the low-crystalline olefin resin A-2, 18 g of the hydrocarbon-based synthetic oil B-1, and 10 g of the tackifier C-1 were replaced with 64 g of the low-crystalline olefin resin A-2, 16 g of the hydrocarbon-based synthetic oil B-1, and 20 g of the tackifier C-1, and peel strength was measured.

Example 5

Example 1 was repeated except that 72 g of the low-crystalline olefin resin A-2, 18 g of the hydrocarbon-based synthetic oil B-1, and 10 g of the tackifier C-1 were replaced with 56 g of the low-crystalline olefin resin A-2, 14 g of the hydrocarbon-based synthetic oil B-1, and 30 g of the tackifier C-1, and peel strength was measured.

Comparative Example 1

Example 1 was repeated except that 72 g of the low-crystalline olefin resin A-2, 18 g of the hydrocarbon-based synthetic oil B-1, and 10 g of the tackifier C-1 were replaced with 80 g of the low-crystalline olefin resin A-2 and 20 g of the hydrocarbon-based synthetic oil B-1, and peel strength was measured.

Comparative Example 2

Example 1 was repeated except that the tackifier C-1 was replaced with the tackifier C-2, and peel strength was measured.

Comparative Example 3

Example 1 was repeated except that the tackifier C-1 was replaced with the tackifier C-3, and peel strength was measured.

Comparative Example 4

Example 1 was repeated except that the tackifier C-1 was replaced with the tackifier C-11, and peel strength was measured.

Comparative Example 5

Example 1 was repeated except that 72 g of the low-crystalline olefin resin A-2, 18 g of the hydrocarbon-based synthetic oil B-1, and 10 g of the tackifier C-1 were replaced with 76 g of the low-crystalline olefin resin A-2, 19 g of the hydrocarbon-based synthetic oil B-1, and 5 g of the tackifier C-4, and peel strength was measured.

Comparative Example 6

Example 1 was repeated except that 72 g of the low-crystalline olefin resin A-2, 18 g of the hydrocarbon-based synthetic oil B-1, and 10 g of the tackifier C-1 were replaced with 90 g of the low-crystalline olefin resin A-2 and 20 g of the hydrocarbon-based synthetic oil B-1, and peel strength was measured.

Table 2 shows evaluation results of Examples 1 to 5 and Comparative Examples 1 to 6.

Here, the evaluation of the peel strength in Table 2 was carried out based on the following criteria.

◯◯: 10 N/cm or more
◯: 6 N/cm or more and less than 10 N/cm
Δ: 3 N/cm or more and less than 6 N/cm
x: less than 3 N/cm

TABLE 2

|  |  | Example 1 | Example 2 | Example 3 | Example 4 | Example 5 |
|---|---|---|---|---|---|---|
| Composition | Low-crystalline olefin resin (A) | A-2 | A-2 | A-2 | A-2 | A-2 |
|  | % by weight | 72 | 72 | 72 | 64 | 56 |
|  | Hydrocarbon-based synthetic oil (B) | B-1 | B-1 | B-1 | B-1 | B-1 |
|  | % by weight | 18 | 18 | 18 | 16 | 14 |
|  | Tackifier (C) | C-1 | C-4 | C-5 | C-4 | C-4 |
|  | % by weight | 10 | 10 | 10 | 20 | 30 |
| Adhesion | Object to be coated | PVC | PVC | PVC | PVC | PVC |
|  | Adherend | HIPS | HIPS | HIPS | HIPS | HIPS |
|  | Press-contacting temperature (° C.) | 150 | 150 | 150 | 150 | 150 |
|  | 180° peel strength | ∘∘ | ∘∘ | ∘∘ | ∘∘ | ∘∘ |

|  |  | Comparative Example 1 | Comparative Example 2 | Comparative Example 3 | Comparative Example 4 | Comparative Example 5 | Comparative Example 6 |
|---|---|---|---|---|---|---|---|
| Composition | Low-crystalline olefin resin (A) | A-2 | A-2 | A-2 | A-2 | A-2 | A-2 |
|  | % by weight | 80 | 72 | 72 | 72 | 76 | 90 |
|  | Hydrocarbon-based synthetic oil (B) | B-1 | B-1 | B-1 | B-1 | B-1 | — |
|  | % by weight | 20 | 18 | 18 | 18 | 19 | 0 |
|  | Tackifier (C) | — | C-2 | C-3 | C-11 | C-4 | C-1 |
|  | % by weight | 0 | 10 | 10 | 10 | 5 | 10 |
| Adhesion | Object to be coated | PVC | PVC | PVC | PVC | PVC | PVC |
|  | Adherend | HIPS | HIPS | HIPS | HIPS | HIPS | HIPS |
|  | Press-contacting temperature (° C.) | 150 | 150 | 150 | 150 | 150 | 150 |
|  | 180° peel strength | x | x | x | x | x | x |

Example 6

Example 1 was repeated except that 72 g of the low-crystalline olefin resin A-2, 18 g of the hydrocarbon-based synthetic oil B-1, and 10 g of the tackifier C-1 were replaced with 72 g of the low-crystalline olefin resin A-2, 18 g of the hydrocarbon-based synthetic oil B-1, and 10 g of the tackifier C-4; the adhesive varnish was applied on a cast polypropylene (CPP) film (100 µm in thickness) in place of the vinyl chloride resin film; and the press-contacting temperature was altered to 120° C.; and peel strength was measured.

Further, when two weeks passed after the CPP film was coated and dried, the resultant was press-contacted and laminated on HIPS by the same method and peel strength was measured. The peel strength at that time was designated as "180° peel strength after the passage of two weeks".

Example 7

Example 6 was repeated except that the tackifier C-4 was replaced with the tackifier C-6, and peel strength and 180° peel strength after the passage of two weeks were measured.

Example 8

Example 6 was repeated except that the tackifier C-4 was replaced with the tackifier C-7, and peel strength and 180° peel strength after the passage of two weeks were measured.

Reference Example 9

Example 6 was repeated except that the tackifier C-4 was replaced with the tackifier C-8, and peel strength and 180° peel strength after the passage of two weeks were measured.

Example 10

Example 6 was repeated except that the tackifier C-4 was replaced with the tackifier C-9, and peel strength and 180° peel strength after the passage of two weeks were measured.

Example 10-2

Example 6 was repeated except that the tackifier C-4 was replaced with the tackifier C-12, and peel strength and 180° peel strength after the passage of two weeks were measured.

Example 11

Example 10 was repeated except that the high impact polystyrene (HIPS) adherend was replaced with a polypropylene (PP) adherend (manufactured by Testpiece Co., Ltd.; 25×50×2 mm) as adherend, and peel strength and 180° peel strength after the passage of two weeks were measured.

Example 12

Example 6 was repeated except that 72 g of the low-crystalline olefin resin A-2, 18 g of the hydrocarbon-based synthetic oil B-1, and 10 g of the tackifier C-4 were replaced with 80 g of the low-crystalline olefin resin A-2, 10 g of the hydrocarbon-based synthetic oil B-1, and 10 g of the tackifier C-4, and peel strength and 180° peel strength after the passage of two weeks were measured.

Example 13

Example 6 was repeated except that 72 g of the low-crystalline olefin resin A-2, 18 g of the hydrocarbon-based synthetic oil B-1, and 10 g of the tackifier C-4 were replaced with 80 g of the low-crystalline olefin resin A-2, 12.9 g of the hydrocarbon-based synthetic oil B-1, and 7.1 g of the tackifier C-4, and peel strength and 180° peel strength after the passage of two weeks were measured.

Example 13-2

Example 6 was repeated except that 72 g of the low-crystalline olefin resin A-2, 18 g of the hydrocarbon-based synthetic oil B-1, and 10 g of the tackifier C-4 were replaced with 75 g of the low-crystalline olefin resin A-2, 19 g of the hydrocarbon-based synthetic oil B-1, and 6 g of the tackifier C-13, and peel strength and 180° peel strength after the passage of two weeks were measured.

Comparative Example 7

Example 6 was repeated except that the tackifier C-4 was replaced with the tackifier C-10, and peel strength and 180° peel strength after the passage of two weeks were measured.

Comparative Example 8

Example 6 was repeated except that 72 g of the low-crystalline olefin resin A-2, 18 g of the hydrocarbon-based synthetic oil B-1, and 10 g of the tackifier C-4 were replaced with 80 g of the low-crystalline olefin resin A-2, 5 g of the hydrocarbon-based synthetic oil B-1, and 15 g of the tackifier C-4, and peel strength and 180° peel strength after the passage of two weeks were measured.

Comparative Example 9

Example 6 was repeated except that 72 g of the low-crystalline olefin resin A-2, 18 g of the hydrocarbon-based synthetic oil B-1, and 10 g of the tackifier C-4 were replaced with 85 g of the low-crystalline olefin resin A-2, 5 g of the hydrocarbon-based synthetic oil B-1, and 10 g of the tackifier C-4, and peel strength and 180° peel strength after the passage of two weeks were measured.

Table 3 shows evaluation results of Examples 6 to 8 and 10 to 13-2, Reference Example 9, and Comparative Examples 7 to 9.

Here, the evaluation of the peel strength and the 180° peel strength after the passage of two weeks in Table 3 was carried out based on the following criteria.

○○: 10 N/cm or more
○: 6 N/cm or more and less than 10 N/cm
Δ: 3 N/cm or more and less than 6 N/cm
x: less than 3 N/cm

TABLE 3

| | | Example 6 | Example 7 | Example 8 | Reference Example 9 | Example 10 |
|---|---|---|---|---|---|---|
| Composition | Low-crystalline olefin resin (A) | A-2 | A-2 | A-2 | A-2 | A-2 |
| | % by weight | 72 | 72 | 72 | 72 | 72 |
| | Hydrocarbon-based synthetic oil (B) | B-1 | B-1 | B-1 | B-1 | B-1 |
| | % by weight | 18 | 18 | 18 | 18 | 18 |
| | Tackifier (C) | C-4 | C-6 | C-7 | C-8 | C-9 |
| | % by weight | 10 | 10 | 10 | 10 | 10 |
| Adhesion | Object to be coated | CPP | CPP | CPP | CPP | CPP |
| | Adherend | HIPS | HIPS | HIPS | HIPS | HIPS |
| | Press-contacting temperature (° C.) | 120 | 120 | 120 | 120 | 120 |
| | 180° peel strength | ○○ | ○○ | ○○ | ○ | ○○ |
| Stability over time | 180° peel strength after the passage of two weeks | Δ | Δ | ○ | Δ | ○ |

| | | Example 10-2 | Example 11 | Example 12 | Example 13 | Example 13-2 |
|---|---|---|---|---|---|---|
| Composition | Low-crystalline olefin resin (A) | A-2 | A-2 | A-2 | A-2 | A-2 |
| | % by weight | 72 | 72 | 80 | 80 | 75 |
| | Hydrocarbon-based synthetic oil (B) | B-1 | B-1 | B-1 | B-1 | B-1 |
| | % by weight | 18 | 18 | 10 | 12.9 | 19 |
| | Tackifier (C) | C-12 | C-9 | C-4 | C-4 | C-13 |
| | % by weight | 10 | 10 | 10 | 7.1 | 6 |
| Adhesion | Object to be coated | CPP | CPP | CPP | CPP | CPP |
| | Adherend | HIPS | PP | HIPS | HIPS | HIPS |
| | Press-contacting temperature (° C.) | 120 | 120 | 120 | 120 | 120 |
| | 180° peel strength | ○○ | ○○ | ○○ | ○○ | ○ |
| Stability over time | 180° peel strength after the passage of two weeks | ○○ | ○○ | ○ | ○○ | ○ |

| | | Comparative Example 7 | Comparative Example 8 | Comparative Example 9 |
|---|---|---|---|---|
| Composition | Low-crystalline olefin resin (A) | A-2 | A-2 | A-2 |
| | % by weight | 72 | 80 | 85 |
| | Hydrocarbon-based synthetic oil (B) | B-1 | B-1 | B-1 |
| | % by weight | 18 | 5 | 5 |

TABLE 3-continued

|  |  |  |  |  |
|---|---|---|---|---|
| Adhesion | Tackifier (C) | C-10 | C-4 | C-4 |
|  | % by weight | 10 | 15 | 10 |
|  | Object to be coated | CPP | CPP | CPP |
|  | Adherend | HIPS | HIPS | HIPS |
|  | Press-contacting temperature (° C.) | 120 | 120 | 120 |
|  | 180° peel strength | x | x | Δ |
| Stability over time | 180° peel strength after the passage of two weeks | x | x | x |

Example 14

Example 6 was repeated except that 72 g of the low-crystalline olefin resin A-2, 18 g of the hydrocarbon-based synthetic oil B-1, and 10 g of the tackifier C-4 were replaced with 72 g of the low-crystalline olefin resin A-2, 18 g of the hydrocarbon-based synthetic oil B-1, 10 g of the tackifier C-9, and 11.1 g of the curing agent D-1; the adhesive varnish was applied on a hard aluminum foil (30 μm in thickness) in place of the vinyl chloride resin film; a polystyrene (PS) adherend (manufactured by Testpiece Co., Ltd.; 25×50×1 mm), instead of the high impact polystyrene (HIPS) adherend, was used as the adherend; and the press-contacting condition was altered to 150° C. and one second; and peel strength and 180° peel strength after the passage of two weeks were measured.

Example 15

Example 14 was repeated except that 72 g of the low-crystalline olefin resin A-2, 18 g of the hydrocarbon-based synthetic oil B-1, 10 g of the tackifier C-9, and 11.1 g of the curing agent D-1 were replaced with 72 g of the low-crystalline olefin resin A-2, 18 g of the hydrocarbon-based synthetic oil B-1, and 10 g of the tackifier C-9, and peel strength and 180° peel strength after the passage of two weeks were measured.

Comparative Example 10

Example 14 was repeated except that 72 g of the low-crystalline olefin resin A-2, 18 g of the hydrocarbon-based synthetic oil B-1, 10 g of the tackifier C-9, and 11.1 g of the curing agent D-1 were replaced with 80 g of the low-crystalline olefin resin A-2, 20 g of the hydrocarbon-based synthetic oil B-1, and 10 g of the curing agent D-1, and peel strength and 180° peel strength after the passage of two weeks were measured.

Table 4 shows evaluation results of Examples 14 and 15 and Comparative Examples 10.

Here, the evaluation of the peel strength and the 180° peel strength after the passage of two weeks in Table 4 was carried out based on the following criteria.
⊙⊙: 10 N/cm or more
◯: 6 N/cm or more and less than 10 N/cm
Δ: 3 N/cm or more and less than 6 N/cm
x: less than 3 N/cm

TABLE 4

|  |  | Example 14 | Example 15 |
|---|---|---|---|
| Composition | Low-crystalline olefin resin (A) | A-2 | A-2 |
|  | % by weight | 64.8 | 72 |
|  | Parts by weight ((A) + (B) + (C) = 100) | (72) | (72) |
|  | Hydrocarbon-based synthetic oil (B) | B-1 | B-1 |
|  | % by weight | 16.2 | 18 |
|  | Parts by weight ((A) + (B) + (C) = 100) | (18) | (18) |
|  | Tackifier (C) | C-9 | C-9 |
|  | % by weight | 9 | 10 |
|  | Parts by weight ((A) + (B) + (C) = 100) | (10) | (10) |
|  | Curing agent (D) | D-1 | — |
|  | % by weight | 10 | 0 |
|  | Parts by weight ((A) + (B) + (C) = 100) | (11.1) | (0) |
| Adhesion | Object to be coated | Al | Al |
|  | Adherend | PS | PS |
|  | Press-contacting temperature (° C.) | 150 | 150 |
|  | 180° peel strength | ◯◯ | ◯◯ |
| Stability over time | 180° peel strength after the passage of two weeks | ◯ | ◯◯ |

|  |  | Comparative Example 10 |
|---|---|---|
| Composition | Low-crystalline olefin resin (A) | A-2 |
|  | % by weight | 72 |
|  | Parts by weight ((A) + (B) + (C) = 100) | 80 |
|  | Hydrocarbon-based synthetic oil (B) | B-1 |
|  | % by weight | 18 |
|  | Parts by weight ((A) + (B) + (C) = 100) | (20) |
|  | Tackifier (C) | — |
|  | % by weight | 0 |
|  | Parts by weight ((A) + (B) + (C) = 100) | (0) |
|  | Curing agent (D) | D-1 |
|  | % by weight | 10 |
|  | Parts by weight ((A) + (B) + (C) = 100) | 11.1 |
| Adhesion | Object to be coated | Al |
|  | Adherend | PS |
|  | Press-contacting temperature (° C.) | 150 |
|  | 180° peel strength | x |
| Stability over time | 180° peel strength after the passage of two weeks | x |

Example 16

(Preparation of Adhesive Varnish)

72 g of the low-crystalline olefin resin A-2, 18 g of the hydrocarbon-based synthetic oil B-1, and 10 g of the tackifier C-9 were dissolved in 400 g of toluene, to give an adhesive varnish.

(Synthesis of Resin for UV-Curing Layer)

A mixed solution composed of 85 g of methyl methacrylate (MMA), 14 g of 2-hydroxyethyl methacrylate (HEMA), 1 g of methacrylic acid (MAA) and 1 g of azobisisobutyronitrile was added dropwise into a reaction vessel that had been charged with 85 g of toluene and 37 g of n-butanol, under the stream of air at 100° C. over 4 hours. Further, with temperature kept at 100° C., 0.2 g of azobisisobutyronitrile was added two times every 1 hour to allow the polymerization to be completed. Three hours after the completion of the dropwise adding, cooling was performed. As a result, a polymer solution having involatile content of 45% and a weight average molecular weight of 25000 was obtained.

Further, 111 g of this polymer solution (solid content: 50 g) was mixed with 50 g of pentaerythritol triacrylate (PETA) and 3 g of IRGACURE 184 (photoinitiator manufactured by Ciba Specialty Chemicals), to give a solution of a resin for UV-curing layer.

(Preparation of Laminate Film)

The above adhesive varnish was applied on a release PET film which had been coated with silicon and which had a film thickness of 200 μm, and was dried at 80° C. for 10 minutes. The resultant adhesive layer had a film thickness of 20 μm. Further, ALMATEX L 1053 (product available from Mitsui Chemicals, Inc., acrylic resin) was applied thereon, and dried at 60° C. for 20 minutes. The resultant intermediate layer had a film thickness of 30 μm. Further, the above resin for UV-curing layer was applied thereon, and dried at 60° C. for 10 minutes. The resultant UV-curing layer had a film thickness of 30 μm. Finally, a PET film (Novaclear SG007; manufactured by Mitsubishi Chemical Corporation) was laminated thereon by using a rubber roll. Thereby, a laminate film was prepared.

(Decorative-Forming Test)

A polypropylene plate (manufactured by Testpiece Co., Ltd.; 25 mm×100 mm×2 mm) was placed on an ascending/descending table attached in a two-sided vacuum forming apparatus having upper and lower boxes (trade name NGF-0404, manufactured by Fu-se Vacuum Forming Ltd.). Thereafter, the release PET film of the laminate film obtained above was peeled off. To a sheet clamping frame located above a molded base material (molded article) in the two-sided vacuum forming apparatus, the laminate film from which the release PET film had been peeled (hereinafter, referred to as the laminate film) was set. Subsequently, pressure was decreased such that the degree of vacuum in the upper and lower boxes was 99.0 kPa, and heating was carried out by using a near infrared heater until the temperature of the laminate film was 120° C. The molded base material was ascended; and the molded base material and the laminate film were press-contacted with each other and the press-contacting was maintained for five seconds. Thereafter, only the upper box was released to atmospheric pressure. A decorative article that was decorated with the laminate film was obtained.

Further, the PET film side of the decorative article was irradiated with ultraviolet ray by using an ultraviolet ray irradiation apparatus with three high-pressure mercury lamps, each with 100 w/cm, the irradiation distance being 10 cm and the line speed being 10 m/min, to allow the UV-curing layer to be cured. A UV (ultraviolet ray) cured article was thus obtained.

The adhesion of the laminate film in the resultant UV (ultraviolet ray) cured article was evaluated as follows.

The sample piece was allowed to standstill at room temperature overnight and was then notched in a strip form of one centimeter in width by using a cutter. By using Autograph (AGS-500B manufactured by Shimadzu Corporation), the polypropylene plate was peeled under conditions of 180° and 100 mm/min to measure peel strength.

The evaluation of the peel strength was carried out based on the following criteria.

○○: 10 N/cm or more
○: 6 N/cm or more and less than 10 N/cm
Δ: 3 N/cm or more and less than 6 N/cm
x: less than 3 N/cm Further, the test was carried out in the same manner as described above for the case in which an ABS resin plate, a polycarbonate.ABS alloy resin plate, a hard vinyl chloride resin plate, an HIPS resin plate, a stainless steel (SUS) plate, and a glass plate (all of which were manufactured by Testpiece Co., Ltd.; 25 mm×100 mm×2 mm) were each used as the adherend in place of the above polypropylene plate, and adhesion to each adherend was evaluated.

Example 17

Example 16 was repeated except that 72 g of the low-crystalline olefin resin A-2, 18 g of the hydrocarbon-based synthetic oil B-1, and 10 g of the tackifier C-9 were replaced with 72 g of the low-crystalline olefin resin A-2, 18 g of the hydrocarbon-based synthetic oil B-1, 10 g of the tackifier C-9, and 11.1 g of the curing agent D-1, and the decorative-forming test for various adherends was carried out.

Comparative Example 11

Example 16 was repeated except that 72 g of the low-crystalline olefin resin A-2, 18 g of the hydrocarbon-based synthetic oil B-1, and 10 g of the tackifier C-9 were replaced with 80 g of the low-crystalline olefin resin A-2 and 20 g of the hydrocarbon-based synthetic oil B-1, and the decorative-forming test for various adherends was carried out.

Comparative Example 12

Example 17 was repeated except that 72 g of the low-crystalline olefin resin A-2, 18 g of the hydrocarbon-based synthetic oil B-1, and 10 g of the tackifier C-9 were replaced with 80 g of the low-crystalline olefin resin A-2 and 20 g of the hydrocarbon-based synthetic oil B-1, and the decorative-forming test for various adherends was carried out.

Table 5 shows evaluation results of Examples 16 and 17 and Comparative Examples 11 and 12.

TABLE 5

|  |  | Example 16 | Example 17 |
|---|---|---|---|
| Com-position | Low-crystalline olefin resin (A) | A-2 | A-2 |
|  | % by weight | 72 | 64.8 |
|  | Parts by weight ((A) + (B) + (C) = 100) | (72) | (72) |
|  | Hydrocarbon-based synthetic oil (B) | B-1 | B-1 |
|  | % by weight | 18 | 16.2 |
|  | Parts by weight ((A) + (B) + (C) = 100) | (18) | (18) |
|  | Tackifier (C) | C-9 | C-9 |
|  | % by weight | 10 | 9 |

TABLE 5-continued

|  |  | | | | | | | | | | | | |
|---|---|---|---|---|---|---|---|---|---|---|---|---|---|
|  | Parts by weight ((A) + (B) + (C) = 100) | (10) | | | | | | (10) | | | | | |
|  | Curing agent (D) | — | | | | | | D-1 | | | | | |
|  | % by weight | 0 | | | | | | 10 | | | | | |
|  | Parts by weight ((A) + (B) + (C) = 100) | (0) | | | | | | (11.1) | | | | | |
| Molding condition | Adherend | PP | ABS | PC·ABS | HIPS | SUS | Glass | PP | ABS | PC·ABS | HIPS | SUS | Glass |
|  | Molding temperature (° C.) | | | 120 | | | | | | 120 | | | |
| Result of molding | Adhesion | ○○ | ○○ | ○○ | ○○ | ○○ | ○○ | ○○ | ○○ | ○○ | ○○ | ○○ | ○○ |

|  |  | Comparative Example 11 | Comparative Example 12 |
|---|---|---|---|
| Composition | Low-crystalline olefin resin (A) | A-2 | A-2 |
|  | % by weight | 80 | 72 |
|  | Parts by weight ((A) + (B) + (C) = 100) | (80) | (80) |
|  | Hydrocarbon-based synthetic oil (B) | B-1 | B-1 |
|  | % by weight | 20 | 18 |
|  | Parts by weight ((A) + (B) + (C) = 100) | (20) | (20) |
|  | Tackifier (C) | — | — |
|  | % by weight | 0 | 0 |
|  | Parts by weight ((A) + (B) + (C) = 100) | (0) | (0) |
|  | Curing agent (D) | — | D-1 |
|  | % by weight | 0 | 10 |
|  | Parts by weight ((A) + (B) + (C) = 100) | (0) | (11.1) |

|  |  | | | | | | | | | | | | |
|---|---|---|---|---|---|---|---|---|---|---|---|---|---|
| Molding condition | Adherend | PP | ABS | PC·ABS | HIPS | SUS | Glass | PP | ABS | PC·ABS | HIPS | SUS | Glass |
|  | Molding temperature (° C.) | | | 120 | | | | | | 120 | | | |
| Result of molding | Adhesion | ○○ | ○ | x | x | ○○ | ○○ | ○○ | ○○ | ○○ | x | ○○ | ○○ |

The invention claimed is:

1. A coating agent comprising
an olefin polymer (A) having a heat of fusion as measured in accordance with JIS K 7122 of in the range of 0 to 50 J/g and having a weight average molecular weight (Mw) as measured by GPC of $1 \times 10^4$ to $1000 \times 10^4$,
a hydrocarbon-based synthetic oil (B) having a 40° C. kinematic viscosity of 5,000 to 500,000 cSt,
a tackifier (C) having an acid value as determined according to JIS K 0070 of 10 or more and having a weight average molecular weight (Mw) as measured by GPC of $0.9 \times 10^3$ to $3 \times 10^3$ and;
a solvent;
wherein the olefin polymer (A) accounts for 30 to 88% by weight, the hydrocarbon-based synthetic oil (B) accounts for 30 to 6% by weight, and the tackifier (C) accounts for 40 to 6% by weight (provided that the total of (A), (B), and (C) is 100% by weight), and
wherein the olefin polymer (A) is at least one selected from the group consisting of (A1"), (A2") and (A3"):
(A1") a propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %);
(A2") a modified olefin polymer obtained from a propylene-based polymer part or whole of which is graft-modified with a polar group-containing monomer, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the modified olefin polymer, 0.1 to 15 parts by weight of structural units derived from the polar group-containing monomer is contained; and
(A3") a halogen-modified olefin polymer obtained from a propylene-based polymer part or whole of which is halogen-modified, the propylene-based polymer containing 50 to 100 mol % of structural units derived from propylene and 50 to 0 mol % of structural units derived from α-olefins having 2 to 20 carbon atoms excluding propylene (provided that the total of propylene and the structural units derived from α-olefins having 2 to 20 carbon atoms is 100 mol %), wherein based on 100 parts by weight of the halogen-modified olefin polymer, the halogen content is 2 to 40 parts by weight.

2. The coating agent according to claim 1, wherein the polar group-containing monomer is at least one selected from unsaturated carboxylic acids and unsaturated carboxylic acid anhydrides.

3. The coating agent according to claim 1, wherein the hydrocarbon-based synthetic oil (B) is a polymer of an olefin having 2 to 20 carbon atoms.

4. The coating agent according to claim 1, wherein the tackifier (C) is a rosin ester or a derivative thereof.

5. The coating agent according to claim 1, further comprising a curing agent (D).

6. The coating agent according to claim 5, wherein the curing agent (D) is at least one selected from an aliphatic polyisocyanate and a multimer of aliphatic polyisocyanate.

7. The coating agent according to claim 1, which is a primer.

8. The coating agent according to claim 1, which is a coating material.

9. The coating agent according to claim 1, which is a hot melt adhesive.

10. A decorative film having at least one layer formed from the coating agent according to claim 1.

11. An article decorated with the decorative film according to claim 10.

12. The article according to claim 11, wherein the decoration is performed using a vacuum pressure forming machine.

* * * * *